United States Patent
Muratani et al.

(10) Patent No.: US 6,757,405 B1
(45) Date of Patent: Jun. 29, 2004

(54) DIGITAL WATERMARK EMBEDDING DEVICE, DIGITAL WATERMARK DETECTION DEVICE AND RECORDING MEDIUM RECORDING COMPUTER READABLE PROGRAM FOR REALIZING FUNCTIONS OF TWO DEVICES

(75) Inventors: Hirofumi Muratani, Kawasaki (JP); Taku Katoh, Kamakura (JP); Naoki Endo, Fuchu (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/450,337

(22) Filed: Nov. 29, 1999

(30) Foreign Application Priority Data

Nov. 30, 1998 (JP) .......................................... 10-340019

(51) Int. Cl.[7] .............................................. G06K 9/00
(52) U.S. Cl. ...................................... 382/100; 380/200
(58) Field of Search ................................. 382/100, 232, 382/250; 380/200

(56) References Cited

U.S. PATENT DOCUMENTS

| | | | |
|---|---|---|---|
| 5,689,587 A | * 11/1997 | Bender et al. | 380/54 |
| 5,850,481 A | * 12/1998 | Rhoads | 382/232 |
| 5,915,027 A | * 6/1999 | Cox et al. | 380/54 |
| 5,930,369 A | * 7/1999 | Cox et al. | 380/54 |
| 6,185,312 B1 | * 2/2001 | Nakamura et al. | 382/100 |
| 6,192,139 B1 | * 2/2001 | Tao | 382/100 |

FOREIGN PATENT DOCUMENTS

EP          0 766 468        4/1997

OTHER PUBLICATIONS

Cox, I. J., et al., "Secure Spread Spectrum Watermarking for Multimedia", NEC Research Institute Technical Report 95–10, pp. 1–33, (1995).

Ohnishi, J., et al., "A Watermarking Scheme to Image Data by PN Sequence", The 1997 Symposium on Cryptography and Information Security (SCIS'97–26B), pp. 1–8 (1997).

Muratani, H., et al., "Survivability Evaluation of a Direct Sequence Spread Spectrum Watermarking", The 1999 Symposium on Cryptography and Information Security (SCIS'99), pp. 503–508 (1999).

\* cited by examiner

*Primary Examiner*—Leo Boudreau
*Assistant Examiner*—Tom Y. Lu
(74) *Attorney, Agent, or Firm*—Finnegan, Henderson, Farabow, Garrett & Dunner, L.L.P.

(57) ABSTRACT

A digital watermark embedding device has an input section which inputs pixel value data of an image which is a target for embedding of watermark information, an embedded position selection section which determines a position in frequency domain into which the watermark information is to be embedded, irrespectively of a frequency component value, a frequency component value variation decision section which determines a variation of a frequency component value at each embedded position determined by the embedded position selection section, a pixel value variation calculation section which calculates a variation of a pixel value at each point in pixel value domain of the image based on the embedded position in frequency domain determined by the embedded position selection section and on the variation of a frequency component value determined by the frequency component value variation decision section, a pixel value conversion section which embeds watermark information by changing corresponding pixel value data of the image in accordance with the variation of a pixel value at each point in pixel value domain calculated by the pixel value variation calculation section, and an output section which outputs pixel value data of the image into which watermark information has been embedded.

16 Claims, 16 Drawing Sheets

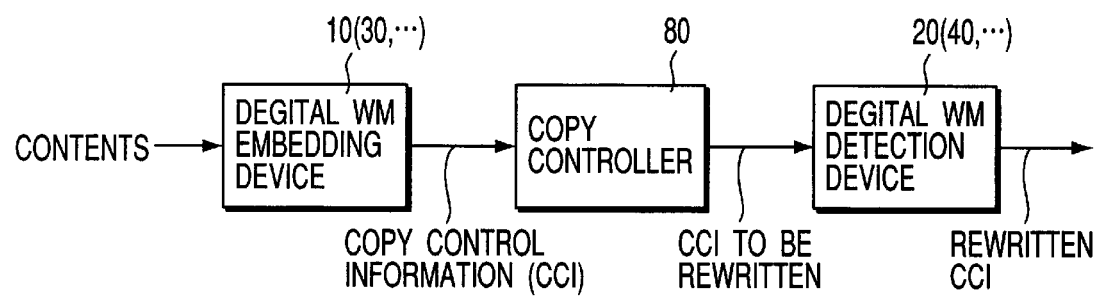
F I G. 27

DIGITAL WATERMARK EMBEDDING DEVICE, DIGITAL WATERMARK DETECTION DEVICE AND RECORDING MEDIUM RECORDING COMPUTER READABLE PROGRAM FOR REALIZING FUNCTIONS OF TWO DEVICES

BACKGROUND OF THE INVENTION

The present invention relates to a digital watermark embedding device and a digital watermark detection device suited to protect a copyright and to control use of data on digital literary properties represented by images and the like by embedding into the data, information (to be referred to as 'watermark information' hereinafter), such as discrimination information on copyright owners and users of the data, information on the right of the copyright owners, conditions for using the data and confidential information necessary to use the data, in a state in which the watermark information is not easily perceived and then by detecting corresponding watermark information from data into which the watermark information is embedded at need.

In recent years, there is a growing interest in the copyright of digital literary properties such as an image (a static image, a dynamic image), voice data, music data, design data, CG (computer graphic) data and text data. As one of techniques for protecting the digital literary properties, there is known a digital watermark technique.

The digital watermark technique is mainly aimed to protect the copyright of the data and control use thereof by embedding, i.e., concealingly inputting into a digital literary property, watermark information ('WM' information) such as discrimination information on the copyright owner and users of the data, information on the right of the copyright owner, conditions for using the data and confidential information necessary to use the data, in a state in which the watermark information cannot be easily perceived.

For the purpose of this type, the digital watermark technique is required to satisfy, in particular, the following characteristics:

(1) Robustness Characteristics

Watermark information is difficult to remove from a literary property and to lose even by various data operations (filtering process, data compression/expansion, D/A conversion, A/D conversion and the like). If data is intentionally manipulated to remove the watermark information, data quality greatly deteriorates.

(2) Perceptual Invisibility Characteristics

The literary property into which watermark information is embedded is perceived similarly as the original literary property.

The digital watermark technique is also required to have embedding efficiency for efficiently embedding watermark information, detection efficiency for efficiently detecting watermark information and the like.

Now, as a typical method of embedding watermark information into, for example, image data by means of the digital watermark technique, there is known a method of converting image data into frequency domains and then embedding watermark information to a specific frequency component.

FIG. 1 is a block diagram showing the constitution of a conventional digital watermark embedding device 200 for embedding watermark information into the image data.

In the device 200, orthogonal transform, such as DFT (discrete Fourier transform), DCT (discrete cosine transform), wavelet transform or Hadamard transform, is conducted to image data in pixel value domain which is a target for embedding of watermark information, by an orthogonal transform section 201 and frequency component value data forming image data in frequency domain is obtained.

Next, watermark (WM) information is embedded into a specific frequency component in the image data in frequency domain in the form of noise having a peak by a digital watermark embedding section 202. The watermark information embedding is conducted in the digital watermark embedding section 202 as follows.

First, based on the frequency component data forming the image data in frequency domain, an embedding frequency component selection section 202a selects a frequency component suited for embedding of watermark information, e.g., a frequency component having a peak in case of embedding the above-stated watermark information as noise. The frequency component variation decision section 202b determines the variation of this frequency component value. The frequency component change section 202c changes the frequency component value forming the image data in frequency domain by a variation determined by the frequency component variation decision section 202b and thereby generates frequency component value data on the image into which the watermark information has been embedded.

Next, inverse transform of the orthogonal transform which has been conducted by the orthogonal transform section 201, is conducted to the image data in frequency domain, into which watermark information has been embedded by the digital watermark embedding section 202, by a reverse-orthogonal transform section 203, to thereby obtain image data in pixel value domain into which watermark information has been embedded.

Thus, the watermark information embedded by the digital watermark device 200 shown in FIG. 1 is embedded into the image data in pixel value domain in a state in which the watermark information is dispersed to the entire image and, therefore, robust against various operations. In addition, if the frequency component into which watermark information is embedded is the frequency component of an intermediate frequency or higher, the watermark information is not lost even by a low frequency pass filter which causes the loss of the LSB information of the image data.

With the constitution shown in FIG. 1, since it is necessary to perform orthogonal transformation twice by means of orthogonal transform, heavy load processing is required. Normally, therefore, an image is first divided into a plurality of blocks. For example, it is assumed that the number of pixels of a certain image in horizontal direction and vertical direction are W and H, respectively. The image is divided into a plurality of rectangular blocks each of which includes w and h pixels in horizontal and vertical directions, respectively. While a pixel positioned on upper-left end point in the image is set as an origin, the number of pixels is counted. If a pixel is in the x-th row and the y-th column, the position of the pixel is expressed as (x, y). If a certain pixel satisfies the following relationships: $i \times w \leq x < (i+1) \times w$ and $h \times h \leq y < (j+i) \times h$, then it belongs to a block positioned in the i-th row in horizontal direction and the j-th column in vertical direction. All of or part of the blocks obtained by dividing the image are subjected to orthogonal transformation, respectively and watermark information is embedded into the blocks.

If orthogonal transform is used to embed watermark information, the quantity of embedding operation is the order of the square of a processed block size. As the block size is larger, the operation quantity considerably increases. Due to this, dedicated hardware is needed if watermark information is embedded into, for example, a dynamic image.

FIG. 2 is a block diagram showing the constitution of a conventional digital watermark detection device 210 for detecting corresponding watermark information from the image data into which watermark information has been embedded by the digital watermark embedding device 200 shown in FIG. 1.

In the device 201, image data in frequency domain is converted to frequency component value data forming image data in frequency domain by orthogonally transforming the image data in pixel value domain into which watermark information has been embedded by an orthogonal transform section 211. Next, a digital watermark detection section 212 detects watermark information having a peak in a specific frequency component from the frequency component value data.

To embed watermark information into target data so that the watermark information is not likely to be lost by various operations, there is proposed a method for spreading and embedding watermark information into a wide range of data by the spread spectrum technique.

FIG. 3 is a block diagram showing the constitution of a conventional digital watermark embedding device 220 for embedding image data while using spread spectrum of PN (pseudo-random number) sequence.

In the device 220, a pixel value at each point in pixel value domain of an image which is a target for embedding of watermark information, is subjected to direct spread spectrum (SS) technique, i.e., the pixel value is multiplied by the pseudo-random number of {−1, 1} referred to as PN sequence generated by a PN sequence generation section 220F, by a spread spectrum section 220A. Then, orthogonal transform, such as DCT transform, is conducted to the pixel value at each point in pixel value domain, to which the spread spectrum is conducted, by an orthogonal transformation section 220B, thereby obtaining frequency component value data forming the spread spectrum image data in frequency domain.

Next, a digital watermark embedding section 220C embeds watermark information in the form of noise having a peak in a specific frequency component in the spread spectrum image data in frequency domain. Then, inverse transform of the orthogonal transform previously conducted by the orthogonal transform section 220B is conducted to the spread spectrum image data in frequency domain into which the watermark information has been embedded, by a reverse-orthogonal transformation section 220D, thereby obtaining spread spectrum image data in pixel value domain into which the watermark information has been embedded. Thereafter, inverse spectrum spreading of the spread spectrum previously conducted by the spread spectrum section 220A is conducted to the spread spectrum image data in pixel value domain into which the watermark information has been embedded, by an inverse spectrum spreading section 220E, thereby obtaining image data in pixel value domain into which the watermark information has been embedded.

As stated above, according to the method for conducting spread spectrum using PN sequence and orthogonal transform and then embedding watermark information into target data, the frequency component into which watermark information is embedded may not be necessarily an intermediate frequency component since spread spectrum using PN sequence is conducted. If watermark information is embedded in the form of a peak, inverse spectrum spreading has an effect of thinly dispersing the watermark information into a wide range of frequency components.

The watermark information embedding as stated above may be possibly effective against data operation by A/D (analog/digital) conversion, D/A (digital/analog) conversion and data compression and expansion, as well. However, since A/D conversion, D/A conversion and data compression and expansion have a great effect on image data, watermark information embedding is desirably conducted by spreading the information into as wide a range as possible.

FIG. 4 is a block diagram showing the constitution of a conventional digital watermark detection section 230 for detecting corresponding watermark information from the image data into which watermark information has been embedded by the digital watermark embedding device 220 shown in FIG. 3.

In the device 230, spread spectrum is conducted to the image data in pixel value domain, into which watermark information has been embedded, by a spread spectrum section 231, using the PN sequence generated by a PN sequence generation section 234. Then, orthogonal transform, such as DCT transform, is conducted to a pixel value at each point in pixel value domain to which the spread spectrum has been conducted, by an orthogonal transformation section 232, and frequency component data forming spread spectrum image data in frequency domain is thereby obtained. Thereafter, watermark information having a peak in a specific frequency component is detected from the obtained frequency component value data by a digital watermark detection section 233.

Further, a technique for embedding watermark information by a patchwork method has been conventionally proposed. FIG. 5 shows the block diagram of a conventional digital watermark embedding device employing this technique.

In a digital watermark embedding device 240 shown in FIG. 5, two pixels are first selected as a pair <(ax, ay), (bx, by)> from the pixel value data on an image into which is a target for embedding of watermark information, by a pixel value pair generation section 241.

Next, if 1 is embedded as watermark information, for example, the pixel value a of the first component in the pair, i.e., the first component (ax, ay) is incremented by 1 by the first component change section 242, whereas the pixel value b of the second component in the pair, i.e., the second component (bx, by) is decremented by 1 by the second component change section 243. If 0 is embedded as watermark information, by contrast, the pixel value of the first component is decremented by 1 by the first component change section 242, whereas the pixel value of the second component is incremented by 1 by the second component change section 243. The above-stated operation is conducted to a plurality of pairs selected at random so as not to overlap each other by the pixel value pair generation section 241.

As a result, if the number of pixels is sufficiently high, the statistically significant difference is expected between the distribution of pixel values of the first components in respective pairs and that of the pixel values of the second components in the respective pairs, as shown in FIG. 6.

FIG. 7 is a block diagram showing the constitution of a conventional digital watermark detection device for detecting corresponding watermark information from the image data into which watermark information has been embedded by the digital watermark embedding device 240 shown in FIG. 5 by means of a patchwork method.

In a digital watermark detection device 250 shown in FIG. 7, the same pair of pixels as those generated by the pixel value pair generation section 241 in the digital watermark embedding device 250 shown in FIG. 5, are generated by a pixel value pair generation section 261. The average of pixel values in the first component of the respective pairs is calculated by the first component average calculation section 262 and the average of pixel values in the second component of the respective pixels is calculated by the second component average calculation section 263.

Next, in an average comparison section 264, the two average values are compared and embedded watermark information is detected (recovered) by judging that 1 is embedded if the average of the pixel values in the first component is higher, and that 0 is embedded if the average of the pixels values in the second component is higher.

The above-stated conventional digital embedding and detection techniques have advantage in that watermark information is difficult to lose by various operations. On the other hand, these techniques, which require orthogonal transform such as DCT transform, have disadvantage in that complexity of computation for embedding and detecting watermark information and a hardware cost are large. That is, DCT transform is a kind of transform introduced by transforming form DFT and the complexity of computation is the same order. A processing of DFT can be performed with high speed by FFT algorithm, and, theoretically, the complexity of computation of the FFT for data of data size N is given as O (N×log N).

Complexity of computation is roughly evaluated using, for example, a static image of W wide by H high. If this static image is divided into blocks of w wide by h high, the complexity of computation per block for the DCT transform is given as O (h×w×log w+w×h×log h)=O (w×h×log (w×h)). While the total number of blocks is (W/w)×(H/h), the total complexity of computation is:

$$O((W/w) \times (H/h) \times w \times h \times \log(w \times h)) = O(W \times H \times \log(w \times h)).$$

The calculation ratio of a case where an image is a block per se to a case where an image is divided into blocks of w wide by h high is:

$$(\log(W \times H))/(\log(w \times h)).$$

Here, if $W = w \times 2^q$ and $H = h \times 2^r$, then $$(\log(W \times H))/(\log(w \times h)) = (1 + (p+q)/\log_2(w \times h)).$$

For example, if $W = H = 1024 = 10^{24}$ and $w = h = 32 = 2^5$, then $q = r = 5$ and $(1+(p+q)/\log_2(w \times h)) = 2$. It follows that the processing speed at which an image is divided into small blocks each having a side which is 1/32 as small as that of an image and DCT transform is conducted to the small blocks is about twice as fast as that at which DCT transform is conducted to an entire image.

However, since the hardware cost is large to mount FFT to a large size of the block with hardware, actually, the hardware mounting is often adapted to perform processing by repeatedly using small FFT. The complexity of computation in this case still becomes the order of the second power of the data size.

How wide the region into which watermark information can be dispersed and embedded will be depends on the complexity of computation of orthogonal transform such as DCT transform and time allowed to embed and detect the watermark information. If it is possible to take sufficient time to embed and detect watermark information, efficiency is not an important factor. From the viewpoint of robustness characteristics, if embedding and detection time falls within a realistic range, it is desirable to set the size of a block to be as large as possible.

In case of using watermark information for the control of use and rating, however, it is impossible to take a lot of time to detect watermark information. In case of using watermark information for finger print, it is impossible to take a lot of time to embed watermark information, either.

As stated above, according to the conventional digital watermark embedding and detection technique, in spite of the fact that it is desirable to select a large block size (such as 512×512 pixels and 720×720 pixels) and thinly and widely disperse watermark information in view of robustness characteristics and perceived non-revealment characteristics, processing for embedding and detecting watermark information cannot be efficiently conducted due to the problem of cost required for the calculation for orthogonal transform. As a result, the conventional technique is disadvantageous in that there is no other choice but to select a small block size (such as 16×16 pixels or 32×32 pixels) and to embed watermark information into the small blocks in case of application requiring high efficiency in the embedding and detection of watermark information.

Meanwhile, according to the conventional digital watermark embedding and detection technique by means of the patchwork method, although it is not required to conduct orthogonal transform such as DCT transform, image data into which watermark information is embedded does not have statistically uniform property. Owing to this, if the number of pixel pairs selected (generated) at random is small, no basis is formed on which it is judged whether the difference in statistical distribution between the first component and the second component in the pairs is due to the embedding operation or a failure to generate sufficient number of pixel pairs, for which reason statistical difference originally exists between the pairs selected by chance. As a result, the conventional technique is disadvantageous in that it requires sufficient number of pairs to make the statistically significant difference in distribution between the first and second components in the respective pairs after embedding operation and in that it is difficult to estimate the necessary number of pixel pairs to be generated during embedding and detection in advance.

BRIEF SUMMARY OF THE INVENTION

It is, therefore, an object of the present invention to provide a digital watermark embedding device capable of efficiently embedding watermark information into target data even if a large block size is selected to divide the data.

It is another object of the present invention to provide a digital watermark detection device capable of efficiently detecting embedded watermark information even if large block size of information is selected or an entire image per se is treated as one block.

It is yet another object of the present invention to provide a digital watermark embedding device and a digital watermark detection device capable of estimating the necessary number of pixel pairs to be generated while watermark information is being embedded and detected by employing a patchwork method.

A digital watermark information according to the present invention is characterized by comprising an input section which inputs pixel value data of an image which is a target for embedding of watermark information; an embedded position selection section which determines a position in frequency domain into which the watermark information is to be embedded, irrespectively of a frequency component value; a frequency component value variation decision section which determines a variation of a frequency component value at each embedded position determined by the embedded position selection section; a pixel value variation calculation section which calculates a variation of a pixel value at each point in pixel value domain of the image based on the embedded position in frequency domain determined by the embedded position selection section and on the variation of a frequency component value determined by the frequency component value variation decision section; a pixel value conversion section which embeds watermark information by changing corresponding pixel value data of the image in accordance with the variation of a pixel value at each point in pixel value domain calculated by the pixel value variation calculation section; and an output section which outputs pixel value data of the image into which watermark information has been embedded.

As described above, with this constitution, watermark information is embedded not in frequency domain as in the conventional device but in pixel value domain. To this end, in the above constitution, a pixel value variation calculation section is provided to embed watermark information in pixel value domain. The pixel value variation calculation section calculates the variation of a pixel value at each point in pixel value domain, based on the position into which watermark information is to be embedded (embedded position) and on the variation of a frequency component value at that position. Although the calculation for obtaining the variation of a pixel value requires an arithmetic operation for obtaining matrix elements of orthogonal transform, the operation quantity is considerably small compared with that of orthogonal transform.

Here, it is possible to easily calculate the variation of a pixel value by the arithmetic operation in which when it is assumed that a variation of a pixel value at each point in pixel value domain of the image is $\Delta f(x)$, the embedded position in frequency domain determined by the embedded position selection section is u and the variation of a frequency component value determined by the frequency component value variation decision section is $\Delta F(u)$, the pixel value variation calculation section calculates an i-th matrix element $A-1(xi, ui)$ of orthogonal transform and calculates a variation $\Delta f(x)$ of a pixel value from a calculation result in accordance with a formula:

$$\Delta f(x(1), \ldots, x(n))=A-1(x(1), u(1))\cdot \ldots \cdot A-1(x(n), u(n))\cdot \Delta F(u(1), \ldots, u(n)),$$

where n is an integer equal to or higher than 1.

In this way, by conducting embedding of watermark information in pixel value domain, the above-stated constitution dispenses with orthogonal transformation for converting pixel value domain to frequency domain and inverse orthogonal transformation for converting frequency domain to pixel value domain conducted after embedding of watermark information in frequency domain, that is, dispenses with two orthogonal transformations which result in great complexity of computation, thereby making it possible to embed watermark information at high speed.

It is noted, however, that the conventional digital watermark technique is capable of determining a watermark information embedded position and the variation of a frequency component value from the frequency component value data of an image obtained by converting pixel value domain to frequency domain, whereas the above-stated constitution is not capable of dynamically determining a watermark information embedded position and the variation of a frequency component value. Nevertheless, since the above constitution dispenses with the conventionally required two orthogonal transformations and allows the size of a block as a unit for watermark embedding processing to be set sufficiently large compared with the conventional case, it is possible to diffuse and embed watermark information into a wide range. Thus, no problem occurs even if the watermark information embedded position is not determined from the frequency component data of the image.

It is, particularly, more desirable that the device is constituted such that a direct sequence spread spectrum method is applied to the above constitution, a pseudo-random number generation section, which generates a pseudo-random number by which a pixel value at each point in pixel value domain of the image is multiplied for spread spectrum, is provided, the variation of a pixel value at each point in pixel value domain of the image is calculated by the pixel value variation calculation section, based on the embedded position in frequency domain determined by the embedded position selection section, on the variation of a frequency component value determined by the frequency component value variation decision section and on the pseudo-random number corresponding to each point in the pixel value domain of the image and generated by the pseudo-random number generation section. This is because such a constitution makes it less necessary to dynamically determine the watermark information embedded position and the variation of a frequency component value in dependence on the frequency component data of the image.

If this spread spectrum method is employed, the variation of a pixel value can be calculated easily by the arithmetic operation in which when it is assumed that a variation of a pixel value at each point in pixel value domain of the image is $\Delta f(x)$, the embedded position in frequency domain determined by the embedded position selection section is u, the variation of a frequency component value determined by the frequency component value variation decision section is $\Delta F(u)$ and the pseudo-random number generated by the pseudo-random number generation means is $p(x)$, the pixel value variation calculation section calculates an i-th matrix element $A-1(xi, ui)$ of orthogonal transform and calculates a variation $\Delta f(x)$ of a pixel value from a calculation result in accordance with a formula:

$$\Delta f(x(1), \ldots, x(n))=p(x(1), \ldots, x(n))\cdot A-1(x(1), u(1))\cdot \ldots \cdot A-1(x(n), u(n))\cdot \Delta F(u(1), \ldots, u(n)),$$

where n is an integer equal to or higher than 1.

In addition, as for the variation of a frequency component value, it is possible to predetermine a variation which is higher than the absolute value of frequency component values at almost all embedded positions. In that case, no problem occurs even if orthogonal transform is not conducted.

To determine an embedded position, for example, a technique for setting a fixed position in frequency domain of the image as an embedded position, a technique for setting a position calculated from user inherent information as an embedded position and the like can be employed. Besides, a technique in which a fixed position is not set as an embedded position, information on the first number frame is fixed but the following embedded positions are determined based on the information read from the fixed frame (in which technique, watermark information is embedded in the first number frame with a predetermined fixed embedded position set as an embedded position, and a certain determined calculation is made according to the watermark information in the first number frame, thereby making it possible to calculate embedded positions in the following frames), a technique for setting a position calculated from user inherent information as an embedded position, a technique for passing an embedded position by means other than watermark information (in which technique, the method of calculating a watermark information embedded position is preset, the data used for embedding of watermark information and necessary for the calculation is fed to the digital watermark detection device not as watermark information embedded into image data but as data different from the image data and the digital watermark detection device calculates an embedded position from the received data and then determines the embedded position), a technique for generating an embedded position using random numbers, a technique for making the random number series different according to users and the like can be employed.

Further, if a plurality of embedded positions in frequency domain are determined for each block, a beat might possibly occur, depending on the embedded positions. Therefore, the embedded position selection section may be provided with a function of judging whether or not a beat occurs between a plurality of frequencies (a beat estimation section). Thus, every time an embedded position candidate is generated, this judging function judges the validity of the candidate. Namely, if it judges that the candidate is inappropriate, the candidate is discarded. If it judges that the candidate is appropriate, the candidate is selected as an element of a group of embedded positions. To do so, the embedded position selection section may consist of a frequency generation section which generates a plurality of embedded position candidates and a beat judging section which inputs a plurality of embedded position candidates generated by the frequency generation section, judges the degree of a beat based on the relationships of frequency component values among the candidates and selects and outputs a group of a predetermined number of embedded positions which can avoid the influence of the beat. It goes without saying that the embedded position selection section can be originally constituted to determine an embedded position which does not cause a beat (i.e., a watermark frequency).

Additionally, as for the variation of a frequency component value, a variation which is preset based on the frequency distributions of frequency component values for a plurality of images may be used. It is more desirable to employ a constitution that a digital watermark detection section, which calculates the frequency component value at the watermark information embedded position based on the image into which the watermark information is embedded by the pixel value conversion section and which feeds back the frequency component value or watermark information recovered from the frequency component value to the frequency component value variation decision section, is provided and that the variation of a frequency component value is adaptively changed based on the frequency component value or the watermark information fed back by this digital watermark detection section. It is further more desirable to employ a constitution that a filtering section, which inputs the image into which watermark information is embedded and which conducts predictable data operation to the image, is provided between the pixel value conversion section and the digital watermark detection section, that the digital watermark detection section calculates a frequency component value at the watermark information embedded position based on the image which has been subjected to this data operation, and that the frequency component value or the watermark information recovered from the frequency component value is fed back to the frequency component value variation decision section.

Furthermore, it is possible to employ a constitution that a frequency component value calculation section, which calculates a frequency component value at each embedded position determined by the above embedded position selection section based on a pixel value at each point in the pixel value domain of the image, is provided and that the frequency component value variation decision section determines the variation of a frequency component value at each embedded position based on the frequency component value at each embedded position. If the spread spectrum method is used, a frequency component value calculation section, which calculates a frequency component value at each embedded position determined by the embedded position selection section based on each embedded position, on a pixel value at each point in the pixel value domain of the image and on the pseudo-random number generated by the pseudo-random number generation section and corresponding to each point in the pixel value domain of the image, may be provided and the frequency component value variation decision section may determine the variation of a frequency component value at each embedded position based on the frequency component value at each embedded position.

In this way, by obtaining a frequency component value at an embedded position, i.e., frequency component values at a small number of points and thereby determining the variation of a frequency component value, it is possible to make a setting such that perceived influence on the image may be reduced and that the variation of a frequency component value due to embedding may be suppressed to be small while using information on general properties about the variation of a frequency component value under various operations (such as a property that the variation of any frequency component value falls within a certain range).

Next, a digital watermark detection device for inputting pixel value data of an image into which watermark information is embedded and detecting the watermark information, according to the present invention is characterized by comprising an embedded position selection section which determines a position in frequency domain into which the watermark information is embedded; a frequency component value calculation section which calculates a frequency component value at each embedded position based on pixel value data of an image into which the watermark information has been embedded and on each embedded position determined by the embedded position selection section; and a watermark information recovery section which recovers the watermark information based on the frequency component value at each embedded position calculated by the frequency component value calculation section.

In this way, with the above constitution, a frequency component value at each embedded position determined by the embedded position selection section is calculated based on a pixel value at each point in the pixel value domain of the image into which watermark information has been embedded and watermark information is recovered based on the frequency component value at the embedded position. Due to this, compared with the conventional detection device which converts the pixel value data of the image into which watermark information is embedded from that in pixel value domain to that in frequency domain by orthogonal transform, acquires frequency component data forming the image data in frequency domain and detects watermark information from the frequency component value data, the device according to the present invention does not require conducting orthogonal transform to thereby decrease the operation quantity and to allow high-speed processing.

Here, the frequency component value can be easily calculated by the arithmetic operation in which when it is assumed that a pixel value at each position in pixel value domain of the image into which the watermark information is embedded is f(x) and the embedded position in frequency domain determined by the embedded position selection section is u, the frequency component value calculation section calculates an i-th matrix element A(ui, xi) of orthogonal transform and calculates a frequency component value F(u) at the embedded position u from a calculation result in accordance with a formula:

$$\Delta F(u(1), \ldots, u(n)) = \Sigma x(0) \ldots \Sigma x(n) A-1(x(1), u(1)) \cdots \cdot A-1(x(n), u(n)) \cdot \Delta f(x(1), \ldots, x(n)).$$

Further, in the digital watermark detection device which employs a direct sequence spread spectrum method and treats an image into which watermark information is embedded as a target for detection of the watermark information, a frequency component value at each embedded position is calculated by the frequency component value calculation section based on the pixel value data of the image into which the watermark information is embedded, on each embedded position determined by the embedded position selection section and on the pseudo-random number series used for spread spectrum. Thus, high-speed processing can be realized.

Here, the frequency component value can be easily calculated by the arithmetic operation in which when it is assumed that a pixel value at each position in pixel value domain of the image into which the watermark information is embedded is f(x), the embedded position in frequency domain determined by the embedded position selection section is u and the pseudo-random number generated by the pseudo-random number generation means is p(xi), the frequency component value calculation section calculates an i-th matrix element A(ui, xi) of orthogonal transform and calculates a frequency component value F(u) at the embedded position u from a calculation result in accordance with a formula:

$$\Delta F(u(1), \ldots, u(n)) = \Sigma x(0) \ldots \Sigma x(n) p(x(1), \ldots, x(n)) \cdot A-1(x(1), u(1)) \cdots \cdot A-1(x(n), u(n)) \cdot \Delta f(x(1), \ldots, x(n)).$$

Meanwhile, it is possible to constitute a digital watermark embedding and detection device provided with both the digital watermark embedding function of the above digital watermark embedding device and the digital watermark detection function of the above digital watermark detection device. In this device, parts common to the both functions are shared between them, thereby making the constitution simple.

Moreover, the present invention is characterized by comprising an input section which inputs pixel value data of an image which is a target for embedding watermark information; a frequency component pair generation section which determines a pair of frequency components at positions in frequency domain into which the watermark information is to be embedded, irrespectively of a frequency component value; a pseudo-random number generation section which generates a pseudo-random number by which a pixel value at each point in pixel value domain of the image is multiplied for spread spectrum; a direct sequence spectrum spreading section which outputs pixel value data spectrum-spread by multiplying pixel value data of the image by the pseudo-random number generated by the pseudo-random number generation section; an orthogonal transformation section which orthogonally transforms the pixel value data spectrum-spread by the direct sequence spectrum spreading section and generates frequency component value data; a first component change section which changes a frequency component value, generated by the orthogonal transformation section, of the first component in the pair of frequency components at the embedded positions generated by the frequency component pair generation section, using a value of the watermark information; a second component change section which changes a frequency component value, generated by the orthogonal transformation section, of the second component in the pair of frequency components at the embedded positions generated by the frequency component pair generation section, using the value of the watermark information, the second component change section changing the frequency component in an opposite direction to that for the change by the first component change means; a reverse-orthogonal transformation section which reverse-orthogonally transforms the frequency component value data changed by the first component change section and the second component change section, and which outputs pixel value data; an inverse spectrum spreading section which conducts inverse spectrum spreading by multiplying the pixel value data outputted from the reverse-orthogonal transformation section by the pseudo-random number generated by the pseudo-random number generation section, and which outputs pixel value data of the image into which the watermark information has been embedded; and an output section which outputs the pixel value data of the image into which the watermark information has been embedded.

As described above, the constitution of the device is characterized in that the patchwork method is not directly applied to the pixel value data of an image but that direct sequence spectrum spreading is conducted by multiplying the pixel value data of the image by the PN sequence random number value, the resultant image data is subjected to orthogonal transformation, a pair of frequency components are generated at random for the transformed image data and thereafter the patchwork method is applied.

The frequency component data obtained by subjecting the image data to orthogonal transformation by direct sequence spectrum spreading has statistically almost uniform distribution close to normal distribution. Therefore, even if the number of frequency component pairs at embedded positions selected at random is small, the statistically significant difference occurs between the frequency component value distributions of the first component (one component) and the second component (the other component) of the pairs after change operations of the first and second component change sections, by the change operations, thereby making significant watermark embedding possible. This facilitates estimating, in advance, the necessary number of pixel pairs to be generated during embedding of watermark information.

Furthermore, a digital watermark detection device, which employs a new patchwork method stated above, inputs the pixel value data of an image into which watermark information is embedded and detects watermark information, a digital watermark detection device for inputting pixel value data of an image into which watermark information is embedded and detecting the watermark information, according to the present invention is characterized by comprising a frequency component pair generation section which determines a pair of frequency components at positions in frequency domain into which the watermark information is to be embedded, irrespectively of a frequency component value; a pseudo-random number generation section which generates a pseudo-random number by which a pixel value at each point in pixel value domain of the image is multiplied for spread spectrum; a direct sequence spectrum spreading section which outputs pixel value data spectrum-spread by multiplying pixel value data of the image at each point in pixel value domain by the pseudo-random number generated by the pseudo-random number generation section; an orthogonal transformation section which orthogonally transforms the pixel value data spectrum-spread by the direct sequence spectrum spreading section and generates frequency component value data; a first component average calculation section which calculates an average of frequency component values, generated by the orthogonal transformation section, of the first component in the pairs of frequency components at respective embedded positions generated by the frequency component pair generation section; a second component average calculation section which calculates an average of frequency component values, generated by the orthogonal transformation section, of the second component in the pairs of frequency components at respective embedded positions generated by the frequency component pair generation section; and an average comparison section which compares the two averages calculated by the first component average calculation section and the second component average calculation section, and recovers the watermark information based on the comparison result.

As stated above, if conducting direct sequence spectrum spreading by multiplying the pixel value data of the image into which watermark information is embedded by the PN sequence random number value, subjecting the resultant image data to orthogonal transformation and calculating averages of the first component and second component in the frequency component pair at the watermark embedded positions, respectively, then averages close to normal distributions can be obtained. This allows the embedded watermark information to be recovered (detected) with high accuracy by comparing the averages and facilitates estimating, in advance, the necessary number of pixel pairs to be generated during the detection of watermark information.

As described so far in detail, according to the present invention, during embedding of watermark information, even if a large block size is selected, calculation costs required for direct sequence spectrum spreading, inverse spectrum spreading, orthogonal transform and reverse-orthogonal transform can be made lower, therefore, high-speed embedding of watermark information can be realized. Owing to this, while there has been conventionally no other choice but to mount the device as hardware in view of performance, it is possible to mount the device or functions as software according to the present invention. In addition, if the function of embedding watermark information is to be realized by a hardware circuit, it can be realized at lower hardware cost than the conventional cost.

Further, according to the present invention, it is possible to prevent the loss of watermark information against various operations including, for example, D/A conversion and A/D conversion while a large block size is selected and the visual degradation of the image is suppressed to be small.

Moreover, according to the present invention, by embedding watermark information at high speed, it is possible to realize a fingerprinting device for embedding information on users and transfer destinations when data such as an image is used and transferred.

Additionally, according to the present invention, by detecting watermark information at high speed, it is possible to apply the present invention to a case of embedding information on control of use and copy control and descramble keys into data such as image, to transfer these pieces of information together with the data and to detect the information instantly when they are used.

According to the present invention, by detecting and embedding a digital watermark at high speed, use method such that the use control, copy control information, and descramble key are extracted from the data of the image etc., the watermark information is erased immediately, another watermark information is superimposed, and watermark information is altered in another watermark information based on those information is possible, when distributing and using.

Furthermore, according to the present invention, even if the orthogonal transformation in which FFT is used is not performed, since a high-speed embedding or detection is possible, the size of the block need not be set in the power of two, and the block of an arbitrary size can be selected. Therefore, to the image and the block with a size different from the power of two, special processing need not be performed about the remainder or the lack part. In addition, when watermark information of arbitrary size (n) is embedded into the image of arbitrary size (W×H) by using this character, special processing to the remainder and the lack part caused by division need not be performed by the block division of w=W/n1, h=H/n2 and n1×n2≧n.

Furthermore, according to the present invention, the patchwork method is not directly applied to the pixel value data of an image. But, after spread spectrum is conducted by multiplying the pixel value data of the image by the PN sequence random number, the resultant image data is subjected to orthogonal transformation, a pair of frequency components at embedded positions are generated at random for the transformed image data and then the patchwork method is applied. By doing so, even if the number of frequency component pairs at embedded positions is small, the statistically significant different occurs between the distributions of frequency component values of the first and second components in the pair after change operations are conducted to the first and second components, respectively. As a result, it is possible to realize significant watermark embedding and highly accurate watermark detection, thereby providing higher-speed processing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 27 is a block diagram which shows the outline configuration of digital watermark embedding and detection device which rewrites copy control information, generates new copy control information based on the copy control information, and embeds the new copy control information.

DETAILED DESCRIPTION OF THE INVENTION

Now, the embodiments of the present invention will be described with reference to the drawings while taking the embedding of watermark information into image data and the detection thereof as an example.

[First Embodiment]

Figure 8:
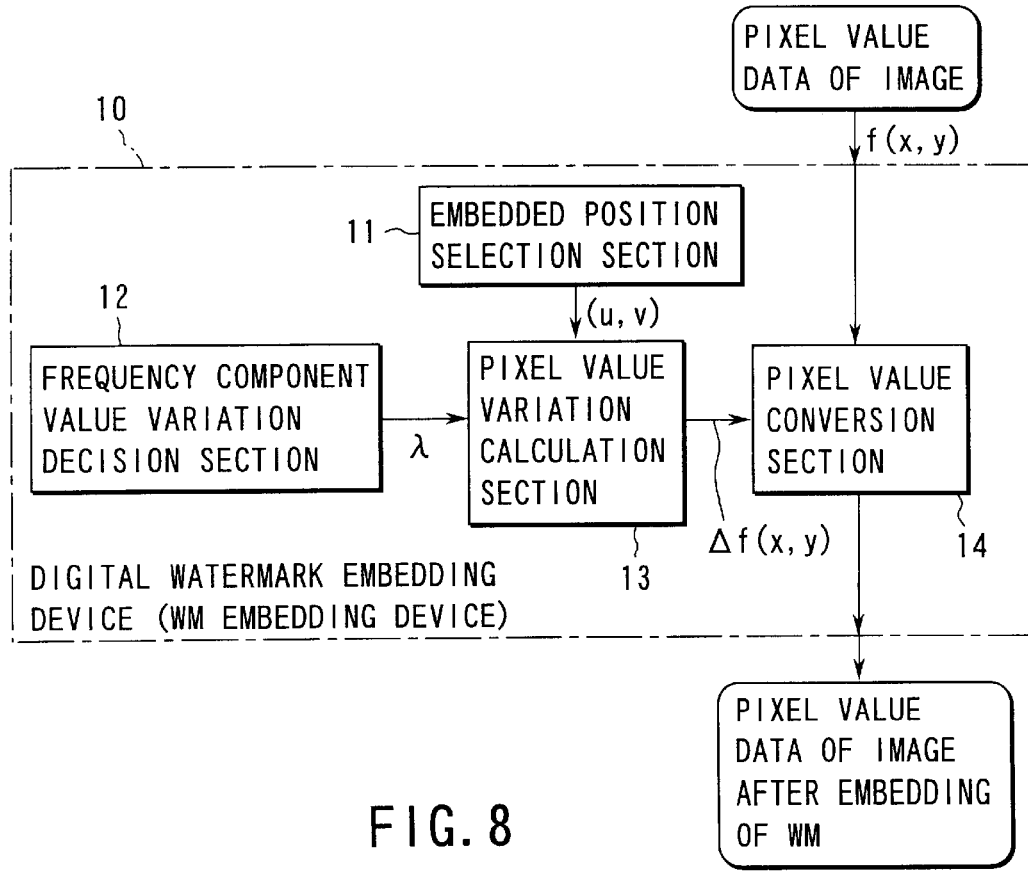
FIG. 8 is a block diagram showing the constitution of a digital watermark embedding device in a first embodiment according to the present invention.

FIG. 8 is a block diagram showing the constitution of a digital watermark embedding device in the first embodiment according to the present invention.

In FIG. 8, a digital watermark embedding device (WM embedding device) 10 inputs the pixel value data of an image which is a target for watermark embedding, embeds watermark information into the image and outputs the pixel value data of the image into which the watermark information has been embedded. In this digital watermark embedding device 10, the data of an entire image or data in units of frames of the image may be inputted and outputted or the data may be continuously inputted and outputted as a bit stream. This is similar to a digital watermark embedding device 30 in the second embodiment to be described later.

The digital watermark embedding device 10 consists of an embedded position selection section 11, a frequency component value variation decision section 12, a pixel value variation calculation section 13 and a pixel value conversion section 14.

The embedded position selection section 11 determines a position in frequency domain (embedded position) to embed watermark information without depending on a frequency component value. The following description will be given while assuming that there is one embedded position (u, v). However, it is possible to provide a plurality of embedded positions. In the latter case, the embedded position selection section 11 provides a group $S_f$ of embedded positions (u, v) in frequency domain.

The embedded position selection section 11 employs a technique in which, for example, a fixed position of an image in frequency domain is set as an embedded position to determine (select) a watermark information embedded position. It is also employ other techniques including a technique in which a fixed position is not set as an embedded position but information on the first number frame is fixed but later positions are determined based on information read by the fixed frame, that in which a position calculated from user inherent information is set as an embedded position, that for providing an embedded position using means other than watermark information, that for forming an embedded position by a random number, that for making random number series different according to users and the like.

Further, a plurality of embedded positions may be determined so as to avoid generating a beat between the watermark information embedded into a plurality of positions by the embedded position selection section 11. For example, if a plurality of embedded positions formed by random numbers have extremes at the same point or a neighborhood point in frequency domain, it is sometimes possible to visually recognize that watermark information is embedded. If the overlap of the extremes is not a point but a region spreading one-dimensionally or two-dimensionally, in particular, the embedding of watermark information may be easily recognized. Then, a function of judging whether or not a distinct beat occurs between a plurality of embedded positions may be provided to the embedded position selection section 11. With this constitution, whenever a candidate for an embedded position is generated, the validity of the candidate is judged using this judging function. If it is judged as an invalid candidate, the candidate is removed. if it is judged as a valid candidate, it is selected as an element in the group $S_f$ of embedded positions.

Figure 9A:
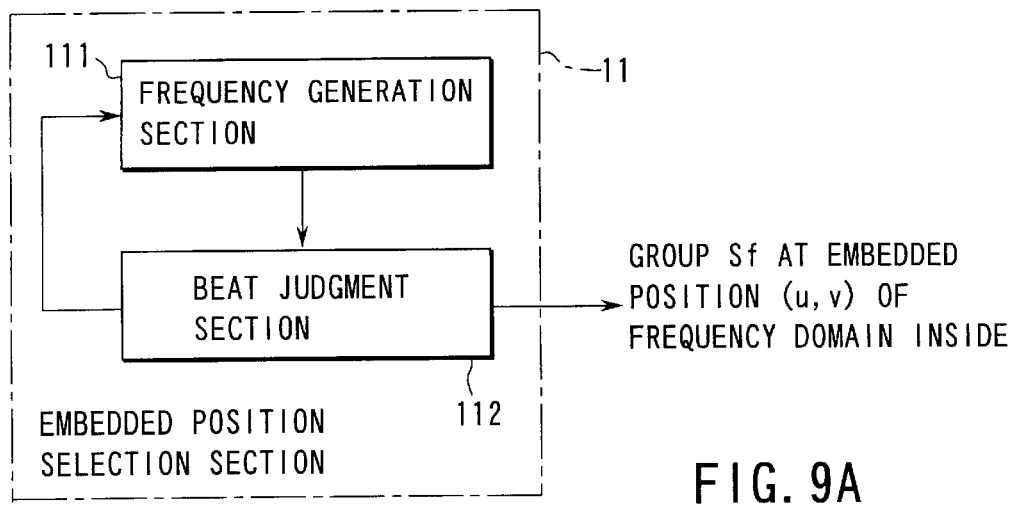
FIGS. 9A and 9B show an example of the constitution of an embedded position selection section 11 shown in FIG. 8 and a flow chart for describing the operation of the embedded position selection section 11, respectively.

An example of the constitution of the embedded position selection section 11 is shown in FIG. 9A. In FIG. 9A, the embedded position selection section 11 consists of a frequency generation section 111 generating a plurality of pairs of watermark frequencies determined by, for example, random numbers as candidates for embedded positions and a beat judgment section 112 inputting the generated plural embedded position candidates, judging the degree of a beat, selecting a group $S_f$ of a predetermined number (N) of embedded positions which may avoid the influence of the beat and outputting the group $S_f$.

Figure 9B:
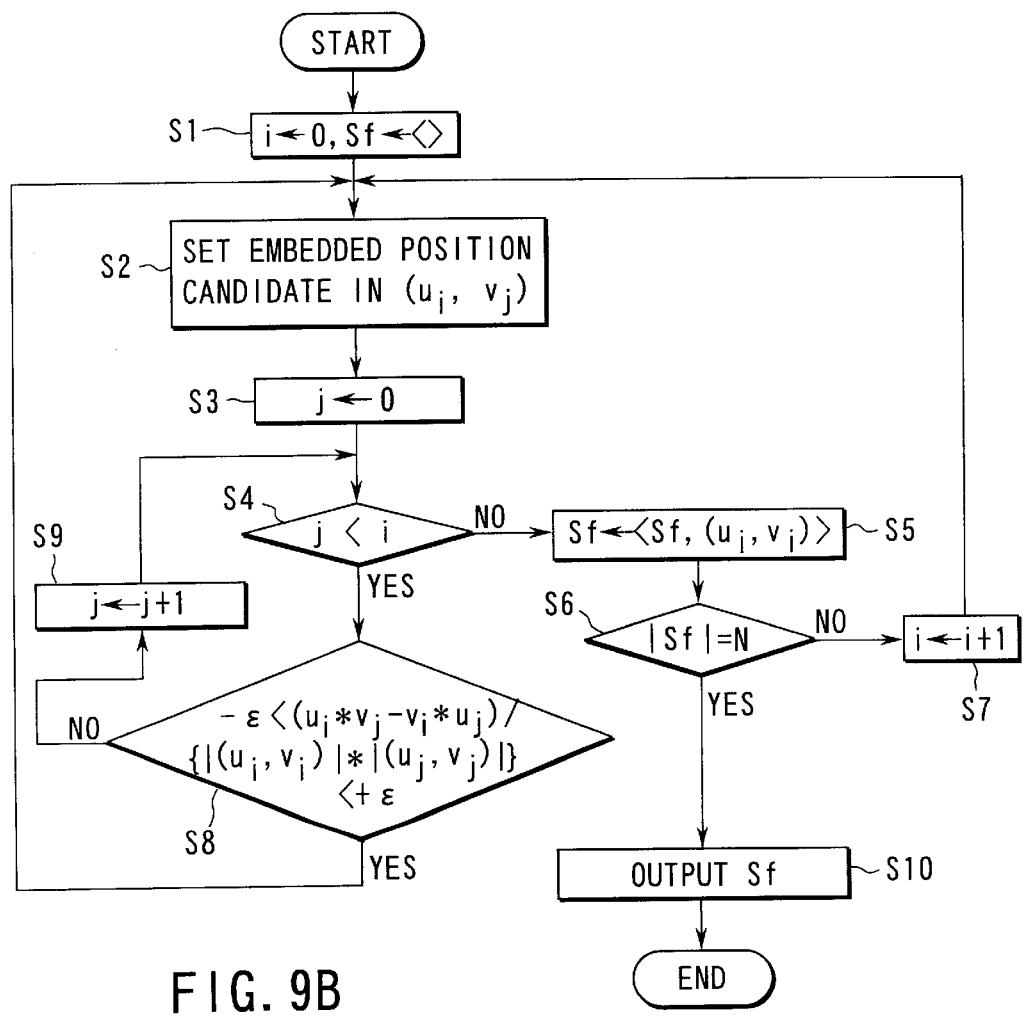

Here, the concrete operation of the embedded position selection section 11 in a case where the embedded position selection section 11 is constituted as shown in FIG. 9A will be described with reference to the flow chart of FIG. 9B.

First, the beat judgment section 112 sets a variable i indicating an embedded position at an initial value 0 and initializes a buffer (list) storing the group $S_f$ of embedded positions $(u_i, v_i)$ (in a step S1). The position $(u_i, v_i)=(0, 0)$ is excluded from the candidates.

In this state, the beat judgment section 112 generates, by the frequency generation section 111, one candidate for an embedded position consisting of a pair of frequencies determined by random number, inputs the embedded position candidate and sets the candidate as $(u_i, v_i)$ (in a step S2).

Next, the beat judgment section 112 sets a variable j indicating an embedded position as a comparison to the embedded position candidate $(u_i, v_i)$ for estimating and judging the degree of a beat in respect of the embedded position candidate $(u_i, v_i)$ at an initial value of 0 (in a step S3). This variable j indicates the j-th selected embedded position (the j-th embedded position in the group $S_f$).

Then, the beat judgment section 112 compares the variables i and j (in a step S4). If the comparison result is not i<j as shown in FIG. 9B, the embedded position candidate $(u_i,$ $v_i)$ of this time is selected as an embedded position and sets it as the j-th position in the group $S_f$ (in a step S5).

Here, if the number of embedded position candidates set in the $S_f$ is N, i.e., i does not reach i=N−1 (in a step S6), the beat judgment section 112 increments i by 1 (in a step S7). Then, the beat judgment section 112 causes the frequency generation section 111 to generate the next embedded position candidate and inputs and sets the embedded position candidate as $(u_i, v_i)$ (in the step S2).

Next, the beat judgment section 112 sets the variable j at the initial value of 0 (in the step S3). If the variable j is lower than i, the section 112 judges whether or not the embedded position candidate $(u_i, v_i)$ inputted in the step S2 of this time has the influence of a beat on the j-th selected embedded position $(u_j, v_j)$, i.e., $(u_j, v_j)$ (in a step S8). In other words, since a wave (watermark) having two or more different frequencies never fails to cause a distinct beat, the beat judgment section 112 judges the degree of a beat as follows for the purpose of suppressing a beat generated region to a small region or to a small dimension.

First, if two or more frequencies in a frequency group have an rational-ratio to one another, a large beat with a frequency of the least common multiple of their frequencies occurs. For example, in an image spreading two-dimensionally, if an rational ratio is established between the two frequencies of watermark, the peak of this beat indicates a grid-like region spreading one-dimensionally. The beat judgment section 112 judges whether or not such an rational ratio or an approximate rational ratio is established among a plurality of frequencies and uses the result to judge the degree of a beat.

Specifically, the beat judgment section 112 judges whether or not the influence of a beat is present by judging whether or not the following relationship between the component (frequency) of the embedded position candidate $(u_i, v_i)$ and that of the j-th selected embedded position $(u_j, v_j)$:

$$(u_i \times v_j - v_i \times u_j)/\{|(u_i, v_i)| \times |(u_j, v_j)|\}$$

satisfies the following judging condition:

$$-\epsilon < (u_i \times v_j - v_i \times u_j)/\{|(u_i, v_i)| \times |(u_j, v_j)|\} < +\epsilon,$$

where $\epsilon$ is a positive number satisfying $1 >> \epsilon$ and may be set at an appropriate value in advance and $|(u, v)|$ indicates the magnitude of a vector $(u, v)$.

Namely, if the two frequency components $(u_i, v_i)$ and $(u_j, v_j)$ are vectors in almost the same direction, a beat causes a one-dimensional or two-dimensional peak region. Thus, to remove a set of frequency components having the above relationship, the beat judgment section 112 makes an judgment according to the above judging condition.

Now, if the relationship between the component (frequency) of the embedded position candidate $(u_i, v_i)$ and that of the j-th selected embedded position $(u_j, v_j)$ satisfies the above judging condition, the beat judgment section 112 judges that a large beat occurs between the embedded position candidate $(u_i, v_i)$ and the embedded position $(u_j, v_j)$ and processing returns to the step S2 without selecting the candidate. Then, the beat judgment section 112 causes the frequency generation section 111 to generate the next embedded position candidate, inputs and sets the embedded position candidate as $(u_i, v_i)$ and conducts processings after step S3.

If the relationship does not satisfy the above condition, the beat judgment section 112 judges that a large beat does not occur between the embedded position candidate $(u_i, v_i)$ and the embedded position $(u_j, v_j)$ and increments the variable j by 1 (in a step S9). If the value of j which has been incremented by 1, is equal to or higher than i, the beat judgment section 112 judges that it can confirm that the embedded position candidate ($u_i$, $v_i$) of this time does not have the influence of a beat on all of the already selected embedded positions (i.e., (i−1) embedded positions), selects the embedded position candidate ($u_i$, $v_i$) as an embedded position and sets the candidate in the j-th position of $S_f$ (in the step S5). On the other hand, if the value of the variable j which has been incremented by 1, is still lower than the variable i, the beat judgment section 112 goes to a step S8 of judging whether or not the embedded position candidate ($u_i$, $v_i$) of this time has the influence of a beat on the j-th selected embedded position ($u_j$, $v_j$), i.e., ($u_j$, $v_j$).

Thereafter, if the number of embedded positions set in the $S_f$ becomes N (in the step S6), the beat judgment section 112 outputs the content of $S_f$, that is, a group of N embedded positions to the pixel value variation calculation section 13 (in a step S10).

In this way, no beat indicating a peak spreading one-dimensionally or two-dimensionally takes place between the respective components of the N embedded positions outputted from the beat judgment section 112 (in the embedded position selection section 11). It is noted that the procedures in accordance with the flow chart of FIG. 9B are given only as an example. In short, N embedded positions which are not likely to cause a perceptually distinct beat between the respective components may be selected as embedded positions from embedded position candidates sequentially generated by the frequency generation section 111.

The judgment of the presence of the influence of the beat of the above-mentioned flowchart is one example, and a different judgment method can be adopted. Whether the rational-ratio between the frequencies exists is judged in the above-mentioned example, but can be judged from the amplitude of the beat. Specifically, the sum of embedding strengths concerning the embedded positions where a rational ratio exist is obtained, and may be judged by comparison between the sum and certain predetermined threshold value.

The above is similar to a case where a group of embedded positions are outputted by an embedded position selection section 31 in the second embodiment to be described later.

The frequency component value variation decision section 12 determines to which values the respective embedded positions (u, v) selected by the embedded position selection section 11 should be changed. In this case, a variation (embedding intensity λ) indicating embedded watermark information is determined (selected). For the selection of this variation, a technique in which watermark information is denoted by, for example, binary numbers and a variation indicating a predetermined value of 0 and a variation indicating 1 are selected in accordance with the binary denotation, can be employed. The embedding intensity λ can be selected without requiring the frequency component value of an image, by setting the intensity which is not dependent on the average of the frequency component values of the image and those of multiple points. For example, while setting, as embedding intensity λ, a value (a positive value) higher than a typical frequency component value, if a variable indicates 1, the embedding intensity λ is selected as variation and if a variable indicates 0, a value obtained by changing the code of the embedding intensity λ can be selected as variation. In this case, in the detection of watermark information, if a frequency component value is a positive value, it can be judged that 1 is embedded and if it is a negative value, it can be judge that 0 is embedded.

Figure 10:
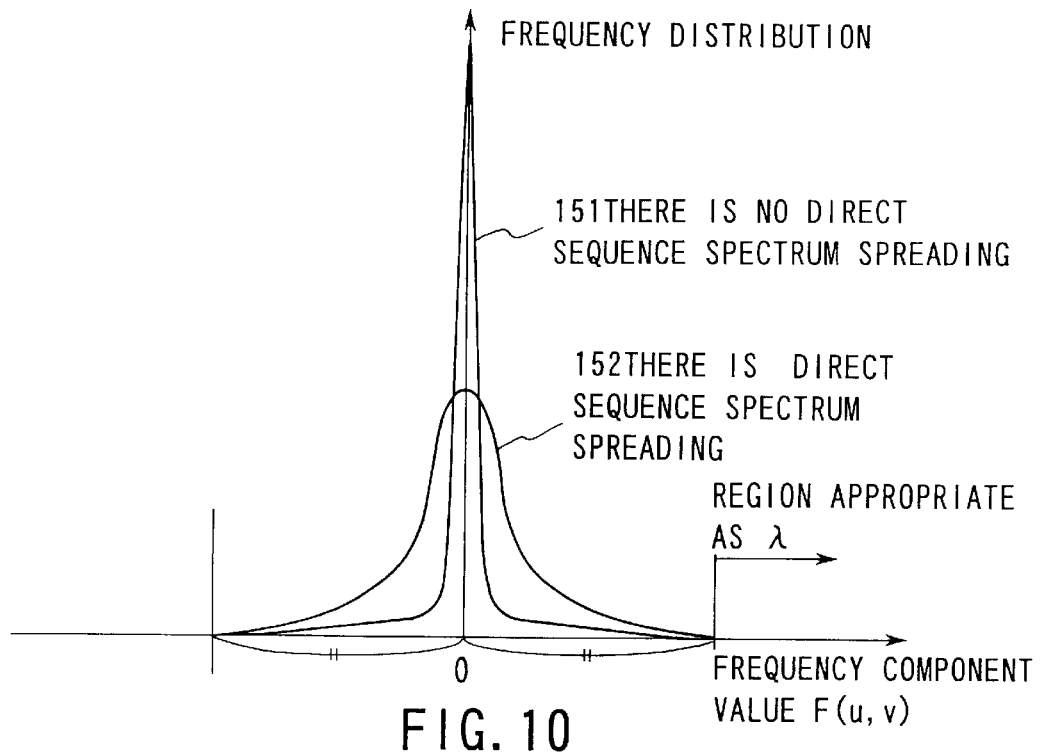
FIG. 10 is a view for describing a way to appropriately set embedding intensity λ using the frequency distribution of frequency component values F.

FIG. 10 is a view for describing the appropriate setting of embedding intensity λ using the frequency distribution of frequency component value F (u, V). In FIG. 10, a frequency distribution 151 shows a case where watermark embedding by means of direct sequence spectrum spreading (SS) is not applied and a frequency distribution 152 shows a case where watermark embedding by means of direct sequence spectrum spreading (SS) is applied in the second embodiment to be described later. By obtaining frequency distributions of a plurality of typical sample images, it has an advantage of being possible to set variation ΔF(u,v) of the frequency component to become an appropriate value for most images. Moreover, for a moving picture, it has an advantage that variation ΔF(u,v) of the frequency component can be set according to assumption that the frequency distribution of the frame thereafter can be approximated from this frequency distribution concerning one or more frames selected continuously or at suitable intervals.

In this embodiment, λ is set to be λ>|F(u, v)| for almost all embedded positions (u, v). Since the variation of a frequency component value is ΔF(u, v)=±λ, the frequency component value after embedding of watermark information is F(u, v)+ΔF(u, v)=±λ+F(u, v). If 1 is embedded, the frequency component value becomes λ+F(u, v)>0 or a positive value in high probability. If 0 is embedded, it becomes −λ+F(u, v)<0 or a negative value in high probability.

As for the embedding intensity, the technique for using user inherent information and selecting different intensities for users can be applied as in the case of the embedded position stated above.

It is noted that if there are a plurality of embedded positions, the frequency component value variation decision section 12 may be constituted to provide a set Λ of embedding intensities λ corresponding to the respective points in the set $S_f$.

The above is also similar to a frequency component value variation decision section 32 in the second embodiment to be described later.

Now, if the frequency component value decision section 12 determines the variation of a frequency component at the embedded position (u, v) as ΔF(u, v), the frequency component value F(u, v) at the position (u, v) becomes F(u, v)+ΔF(u, v) after embedding of watermark information.

The pixel value variation calculation section 13 calculates the variation Δf(x, y) of a pixel value at each point (x, y) in the pixel value domain of an image which is a target for embedding of watermark information, by inputting the embedded position (u, v) in frequency domain selected by the embedded position selection section 11 and the variation ΔF(u, v) of the frequency component value determined by the frequency component value variation decision section 12.

In this case, the pixel variation calculation section 13 calculates the variation Δf(x, y) of a pixel value in accordance with the following Formula (1):

$$\Delta f(x, y) = A^{-1}(x, u) \cdot A^{-1}(y, v) \cdot \Delta F(u, v) \qquad (1).$$

It is noted that the calculation formula for a case of embedding watermark information two-dimensionally is shown in the above calculation of the variation; however, the calculation should not be limited to the two dimensions but can be applied to a one dimension (e.g., voice data in this case) and three or more dimensions. In the n-dimensional case, a formula can be expressed as $$\Delta f(x^{(1)}, \ldots, x^{(n)}) = A^{-1}(x^{(1)}, u^{(1)}) \cdot \ldots \cdot A^{-1}(x^{(n)}, u^{(n)}) \cdot \Delta F(u^{(1)}, \ldots, u^{(n)})$$

where Δf(x) is the variation of a pixel value at each point in pixel value domain, ΔF(u) is the variation of a frequency component value and $A_i^{-1}(x_i, u_i)$ is the i-th matrix element of orthogonal transform having, as elements, the position of an image in space domain and an embedded position in frequency domain. Symbols x and u are positional coordinates and corresponds to the dimension of the space domain and frequency domain. For brevity, description will be given while a two-dimensional image is used as a target.

Figure 11:
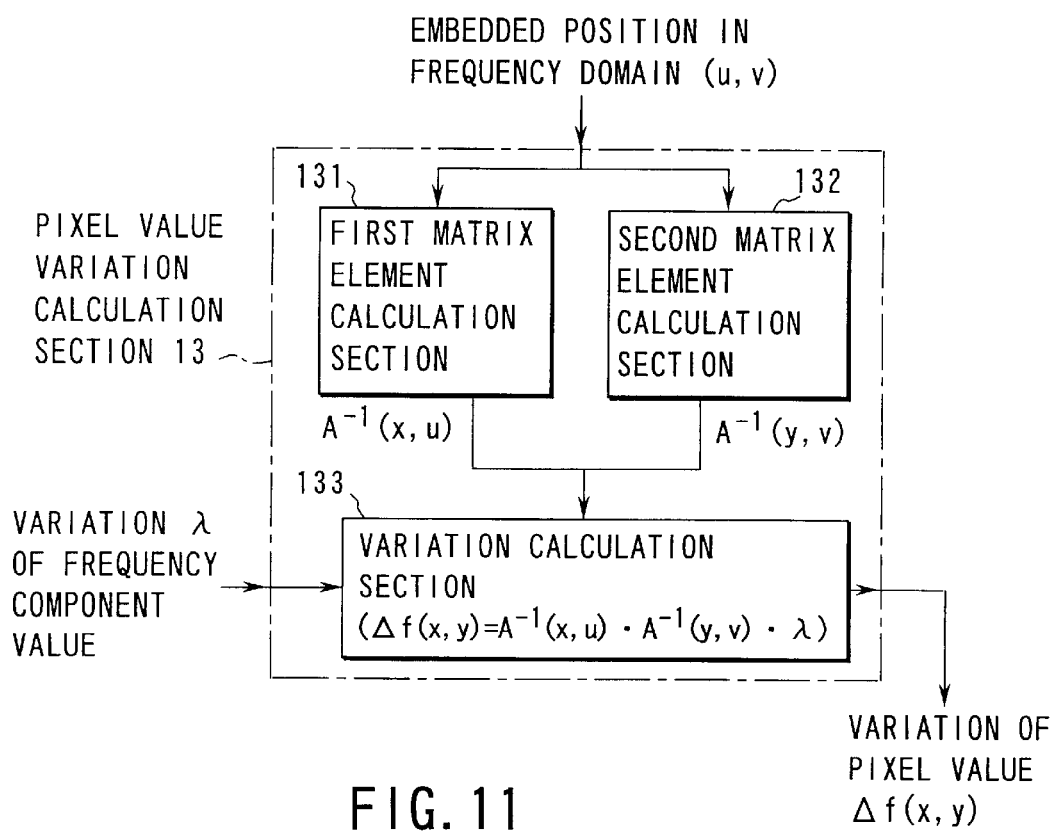
FIG. 11 is a block diagram showing an example of the constitution of a pixel value variation calculation section 13 shown in FIG. 8.

An example of the constitution of the pixel value variation calculation section 13 conducting the above calculation is shown in FIG. 11.

In the example of FIG. 11, the pixel value variation calculation section 13 consists of the first matrix element calculation section 131, the second matrix element calculation section 132 and a variation calculation section 133.

The first matrix element calculation section 131 sequentially inputs embedded positions (u, v) in frequency domain selected by the embedded position selection section 11 and calculates the first matrix element $A^{-1}$ (x, u) of orthogonal transform. Likewise, the second matrix element calculation section 132 sequentially inputs embedded positions (u, v) in frequency domain and calculates the second matrix element $A^{-1}$ (y, v) of orthogonal transform.

The variation calculation section 133 inputs the calculation results of the first matrix element calculation section 131 and of the second matrix element calculation section 132 and the variation $\Delta F(u, v)$ (=±λ) determined by the frequency component value variation decision section 12, makes a calculation in accordance with the above Formula (1) and thereby obtains the variation $\Delta f(x, y)$ of a pixel value at each point (x, y) in pixel value domain corresponding to the embedded position (u, v) in frequency domain. The variation $\Delta f(x, y)$ of a pixel value at each point (x, y) in pixel value domain is fed to the pixel value variation section 14 as the output of the pixel value variation calculation section 13.

If a plurality of embedded positions, set as $(u_i, v_i)$, in frequency domain are selected by the embedded position selection section 11, the variations of pixel values at the respective positions (x, y) in pixel value domain corresponding to the embedded positions $(u_i, v_i)$ are obtained for the embedded positions $(u_i, v_i)$, respectively. The sum of the variations for the respective embedded positions $(u_i, v_i)$ at the point (x, y), i.e., $\Sigma_i A^{-1}(x, u_i) \cdot \Delta A^{-1}(y, v_i) \cdot \Delta F(u_i, v_i)$ may be set as the variation $\Delta f(x, y)$ of a pixel value.

Meanwhile, if pixel values are discrete values such as, for example, integer values, the little variation of a pixel value becomes zero due to an error of round-off to an integer value. Owing to this, the pixel value variation calculation section 13 may adopt one of stochastically adjacent integer values instead of simply running down shifts from an integer value so that even dispersed and embedded watermark information may not be lost due to the influence of round-off and watermark information can be reproduced.

Referring back to FIG. 8, the pixel value conversion section 14 converts image data in accordance with the variation $\Delta f(x, y)$ of a pixel value at each point (x, y) in pixel value domain fed from the pixel value variation calculation section 13.

Figure 1:
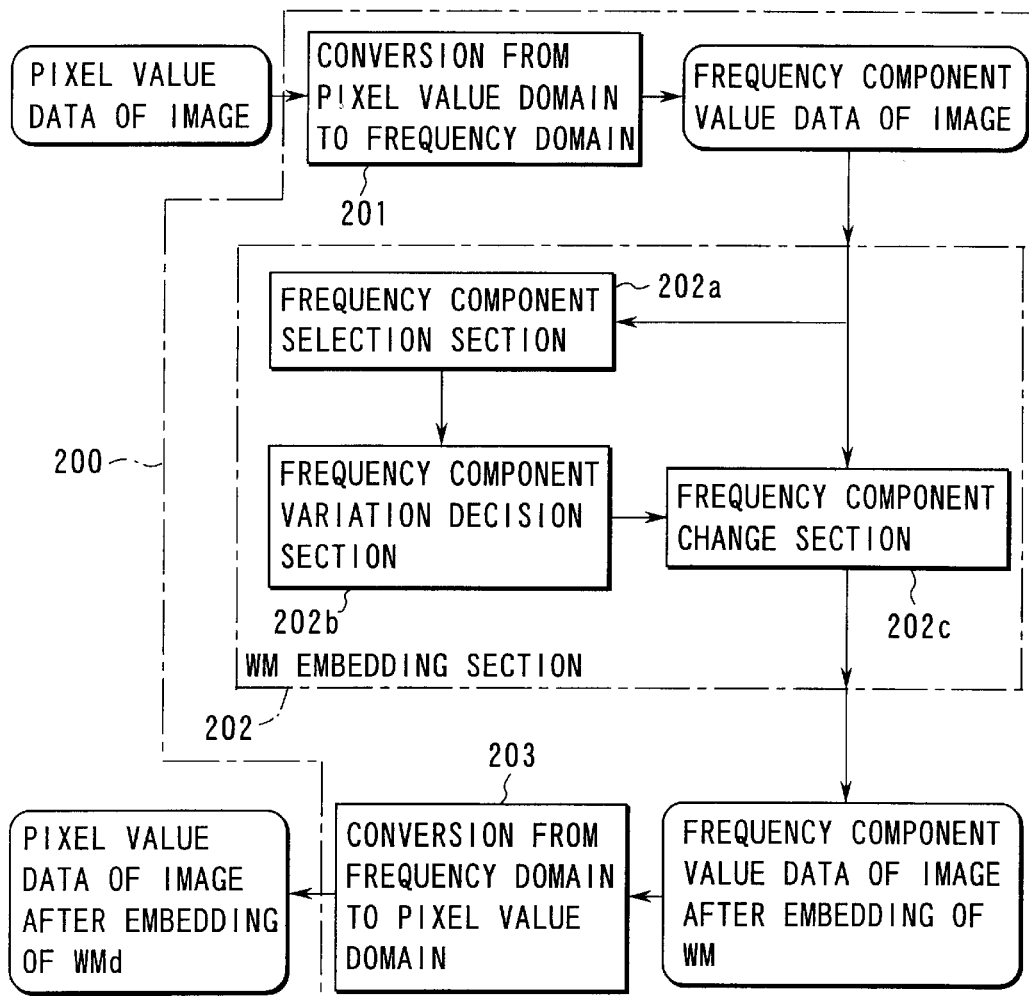
FIG. 1 is a block diagram showing the constitution of a conventional digital watermark embedding device for embedding watermark information in frequency domain.
Figure 2:
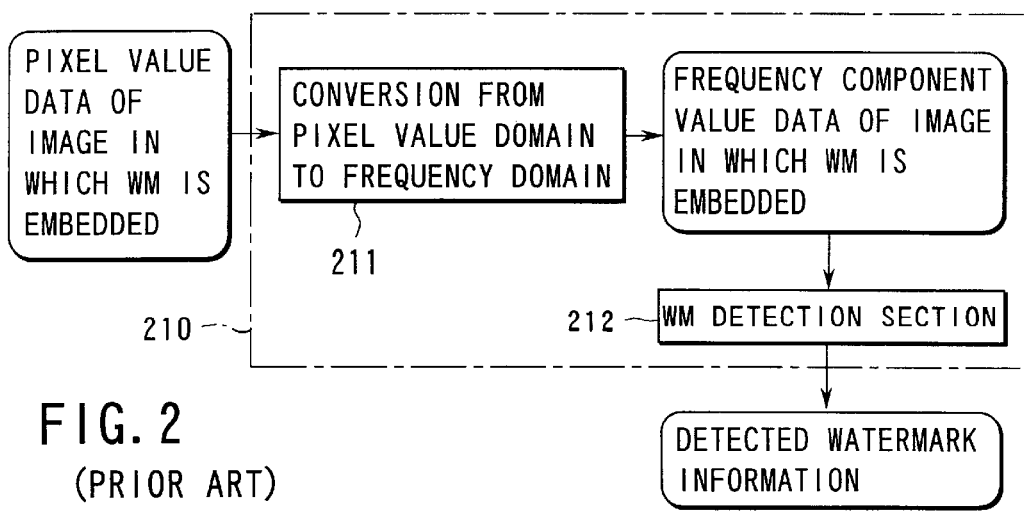
FIG. 2 is a block diagram showing the constitution of a conventional digital watermark detection device for detecting embedded watermark information in frequency domain by the digital watermark embedding device shown in FIG. 1.
Figure 3:
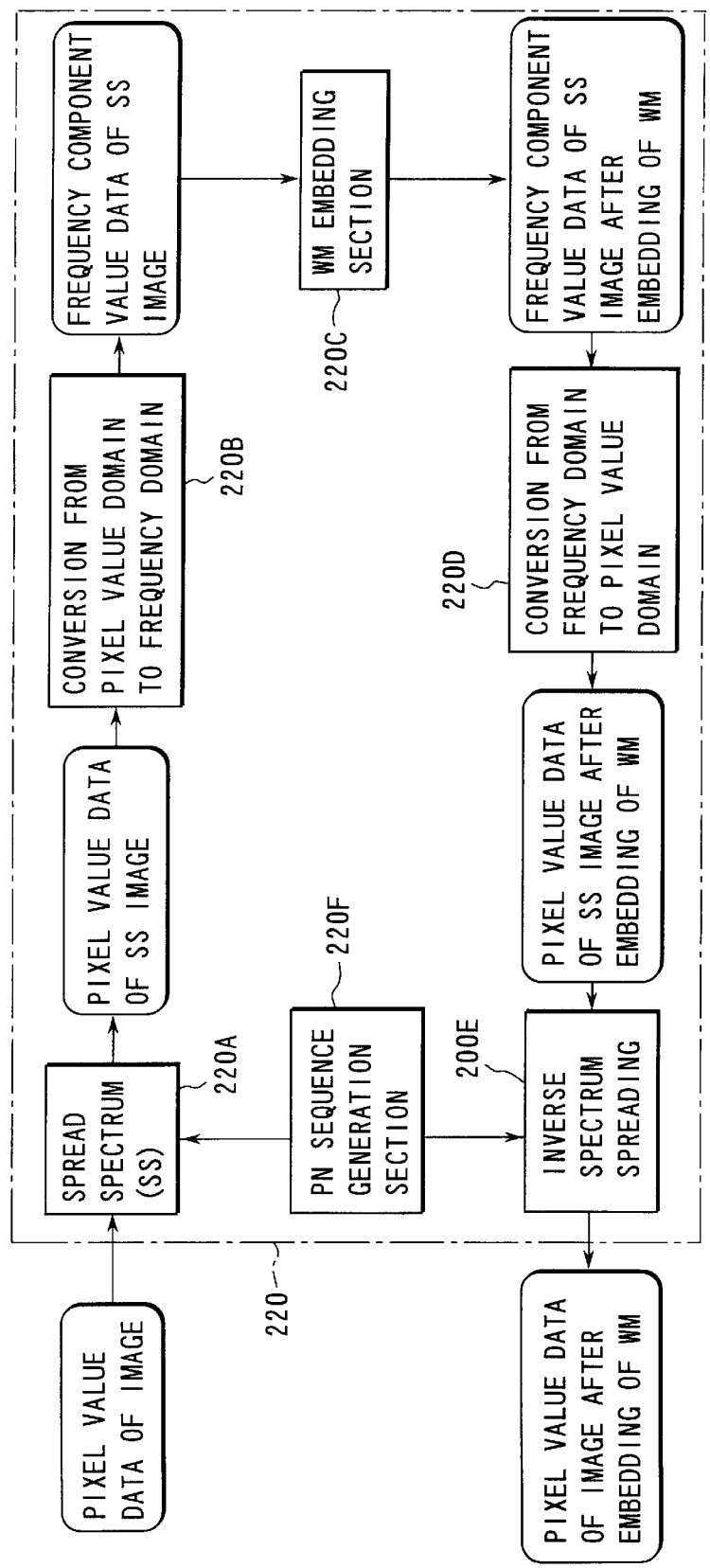
FIG. 3 is a block diagram showing the constitution of a conventional digital watermark embedding device for embedding watermark information into a spread spectrum image in frequency domain.
Figure 4:
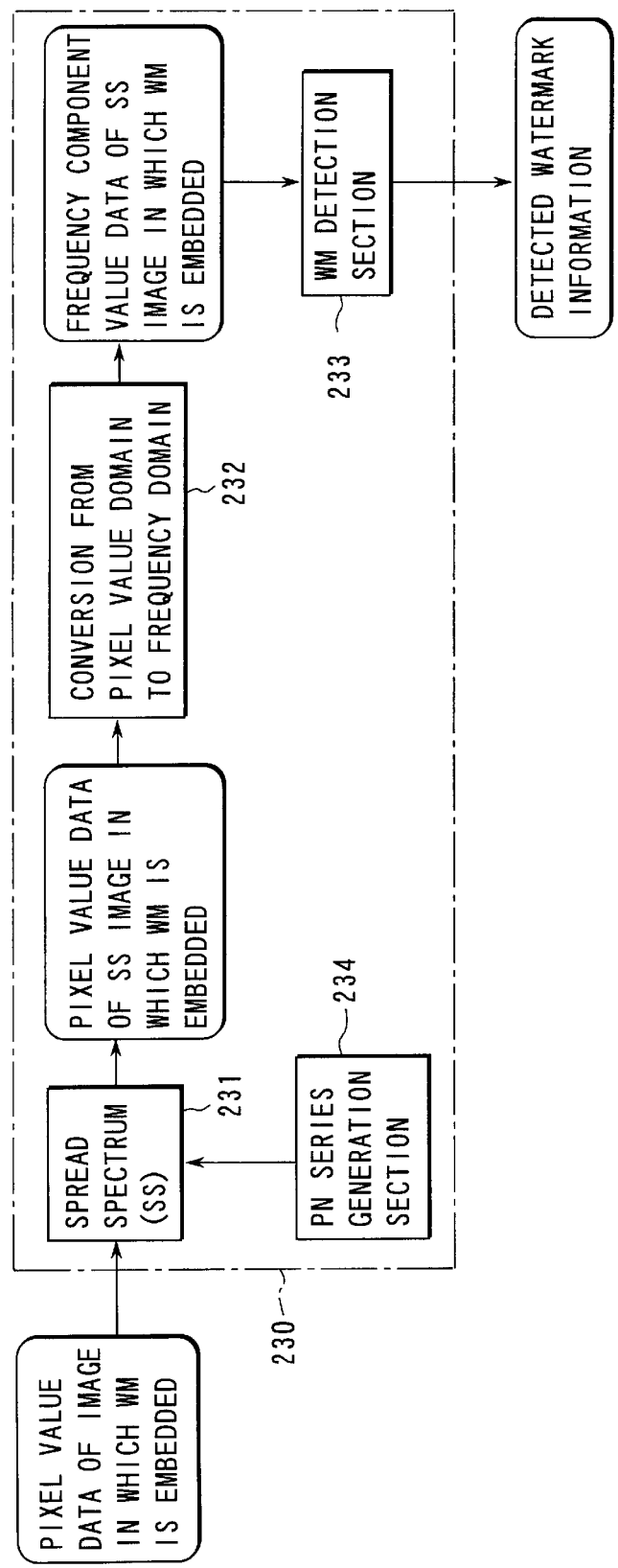
FIG. 4 is a block diagram showing the constitution of a conventional digital watermark detection device for detecting watermark information embedded in the frequency domain of the spread spectrum image by the digital watermark embedding device shown in FIG. 3.
Figure 5:
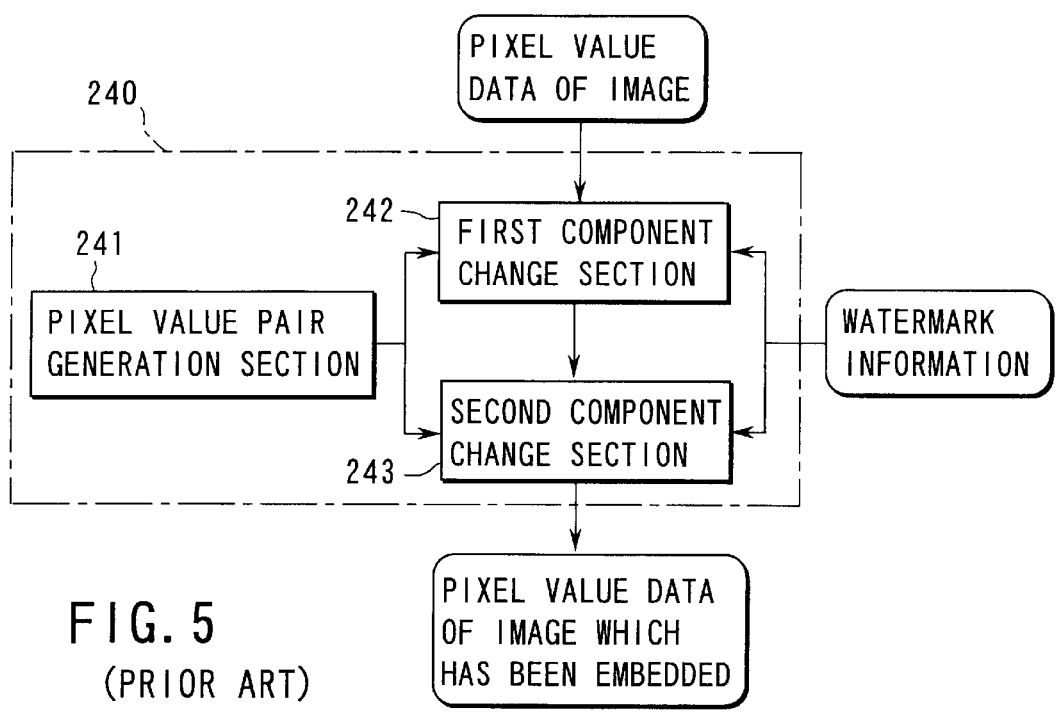
FIG. 5 is a block diagram showing the constitution of a conventional digital watermark embedding device employing a patchwork method.
Figure 6:
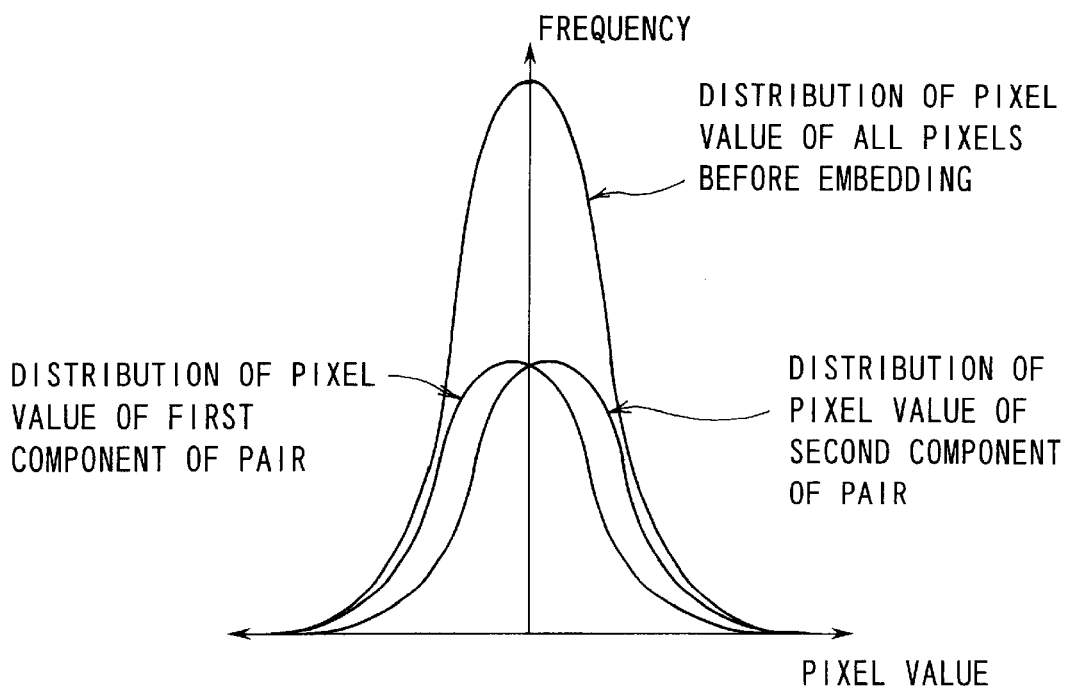
FIG. 6 shows the distribution of pixel values of all pixels before embedding of watermark information and that of pixel values of the paired first and second components of a pixel after embedding by the digital watermark embedding device shown in FIG. 5.
Figure 7:
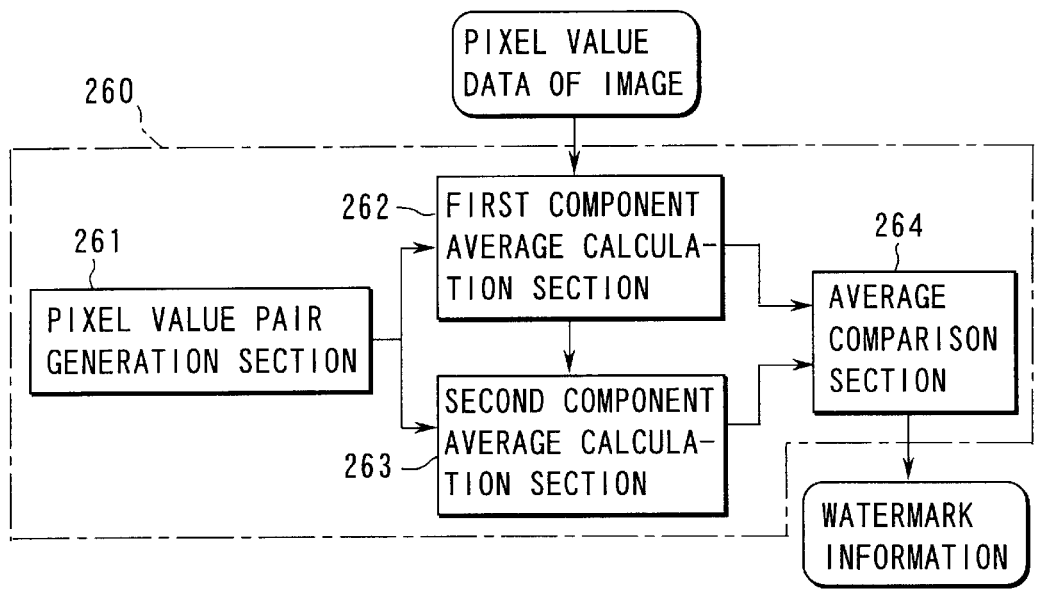
FIG. 7 is a block diagram showing the constitution of a conventional watermark detection device for detecting watermark information embedded by the digital watermark embedding device shown in FIG. 5.

As described above, in this embodiment, processing for embedding of watermark information (or the determination of a watermark information embedded position after orthogonal transform required for the processing) can be realized without conducting calculations for orthogonal transform, inverse transform required for the conventional technique shown in FIG. 1 and those for direct sequence spectrum spreading and inverse spectrum spreading required for the conventional technique shown in FIG. 2. Therefore, if the digital watermark embedding device 10 in this embodiment is employed, it is possible to sequentially embed watermark information in a real-time manner without the need to prepare a large (mass-storage) buffer even when input images are given as stream data.

The above description concerns a case where the entire frame of an image is set as one block and watermark information is embedded into the block. It is also possible to embed blocks obtained by dividing a frame into a plurality of blocks.

Furthermore, the above description concerns a case where the block as an embedding target is a two-dimensional block. However, the present invention should not be limited thereto. For example, it is also possible to expand blocks to three-dimensional blocks by setting an embedded region including time direction.

By doing so, even if watermark information cannot be sufficiently dispersed and embedded into small blocks in one frame, it is possible to sufficiently disperse and embed watermark information by using a region covering a plurality of frames and thereby obtaining sufficient number of pixel points. It is also possible to embed watermark information in the form resistant to thinning out of frames.

If blocks are expanded three-dimensionally and pixel value data in blocks spreading in time direction is stored once and then converted to frequency data, problems such as the occurrence of time delay due to the processing and heavy-load processing, may possibly occur. In this embodiment, however, due to the fact that watermark information can be sequentially embedded into inputted stream data, it is possible to embed watermark information at high speed without the need to prepare a large buffer.

At that time, for purposes of preventing block boundaries from being visually recognized, variations of pixel values as a result of embedding of watermark information may be faded out around the block regions. Since the watermark information is dispersed and embedded into the entire blocks, it is possible to accurately detect the embedded watermark information even with the peripheral portions of the blocks being faded out.

The blocks in a three-dimensional image may have an offset so that pieces of every frame can be arranged at different positions. The offset may be randomly set. In addition, as long as appropriate orthogonal transform can be defined, the shape of a block need not be always a rectangular parallelepiped. Besides, even if blocks are two-dimensional ones, there is no need to embed watermark information into the blocks in a state in which the blocks are constrained within a frame and watermark information may be embedded freely into the three-dimensional image.

Figure 12:
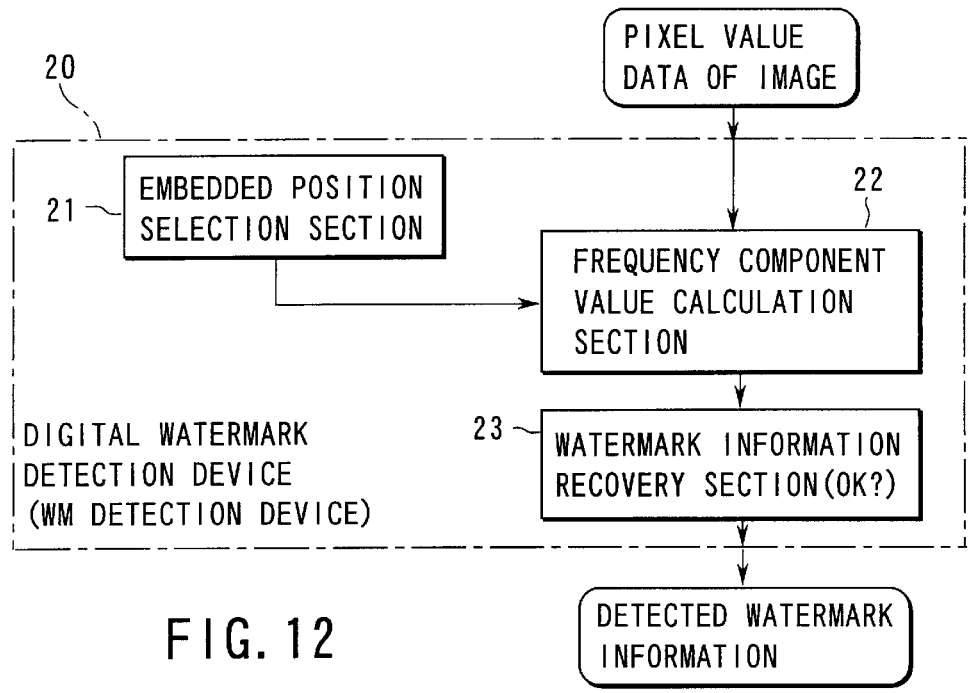
FIG. 12 is a block diagram showing the constitution of a digital watermark detection device in the first embodiment according to the present invention.

FIG. 12 is a block diagram showing the constitution of a digital watermark detection device in the first embodiment according to the present invention.

In FIG. 12, a digital watermark detection device (WM detection device) 20 inputs pixel value data of an image which is a target for the detection of watermark information and into which watermark information has been embedded by the digital watermark embedding device 10 shown in FIG. 8, and detects and outputs watermark information therefrom.

The digital watermark detection device 20 consists of an embedded position selection section 21, a frequency component value calculation section 22 and an embedded information recovery section 23.

The embedded position selection section 21 has the same function as that of the embedded position selection section 11 in the digital watermark embedding device 10 shown in FIG. 8. The section 21 selects the same position (u, v) as the embedded position (u, v) in frequency domain selected by the embedded position selection section 11 during embedding. Information on the selected embedded position (u, v) is fed to the frequency component value calculation section 22.

The frequency component value calculation section 22 calculates a frequency component value F (u, v) at the position (u, v) in frequency domain selected by the embedded position selection section 21 according to the following Formula (2):

$$F(u, v) = \Sigma_x \Sigma_y A(u, x) \cdot A(v, y) \cdot f(x, y) \quad (2)$$

Where A(u, x) and A(v, y) are matrix elements of orthogonal transform.

Figure 13:
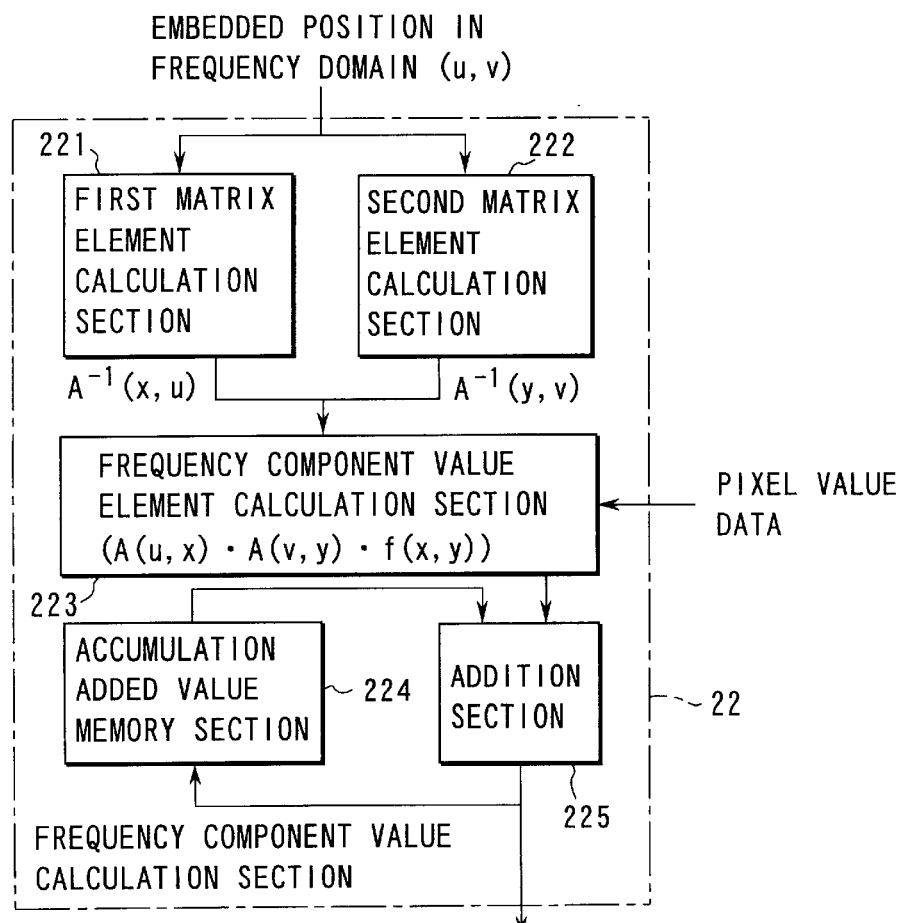
FIG. 13 is a block diagram showing an example of the constitution of a frequency component value calculation section 22 shown in FIG. 12.

An example of the constitution of the frequency component value calculation section 22 will be shown in FIG. 13.

In the example of FIG. 13, the frequency component value calculation section 22 consists of the first matrix element calculation section 221, the second matrix element calculation section 222, a frequency component value element calculation section 223, an accumulation added value memory section 224 and an addition section 225.

The first matrix element calculation section 221 sequentially inputs embedded positions (u, v) in frequency domain selected by the embedded position selection section 21 and calculates the first matrix element A(u, x) of orthogonal transform. Likewise, the second matrix element calculation section 222 sequentially inputs embedded positions (u, v) in frequency domain and calculates the second matrix element A (v, y) of orthogonal transform.

The frequency component value element calculation section 223 inputs the calculation results of the first matrix element calculation section 221 and of the second matrix element calculation section 222, sequentially inputs pixel values f(x, y) at each point (x, y) in pixel value domain corresponding to the embedded positions (u, v) in frequency domain, and every time inputting them, the section 223 calculates A(u, x)·A(v, y)·f(x, y), that is, the element of a frequency component value.

The accumulation added value memory section 224 is used to store the sum (accumulation value) of A(u, x)·A(v, y)·f(x, y) calculated by the frequency component value element calculation section 223 to date.

The addition section 225 adds the calculation result of the frequency component value element calculation section 223 and the content of the accumulation added value memory section 224 at that time and obtains the sum (accumulation value) of A(u, x)·A(v, y)·f(x, y) calculated by the frequency component value element calculation section 223 every time the frequency component value element calculation section 223 calculates A(u, x)·A(v, y)·f(x, y). The content of the accumulation added value memory section 224 is updated to this calculation result of the addition section 225.

If the pixel values f(x, y) of all of the pixels in blocks as an embedding target are inputted, A(u, x)·A(v, y)·f(x, y) with respect to the final value f(x, y) is calculated by the frequency component value element calculation section 223 and the calculation result of the section 223 and the content of the accumulation added value memory section 224 (initial value: 0) are added together by the addition section 225, then the addition result $\Sigma_x \Sigma_y A(u, x) \cdot A(v, y) \cdot f(x, y)$ is outputted from the frequency component value calculation section 22 to the watermark information recovery section 23 as the frequency component value F(u, v) of the embedded value (u, v) selected by the embedded position selection section 21.

The watermark information recovery section 23 recovers the embedded watermark information by F(u, v) outputted from the frequency component value calculation section 22. This recovery can be realized by estimating that 1 is embedded if F(u, v)>0 and 0 is embedded if F(u, v)<0.

[Second Embodiment]

Figure 14:
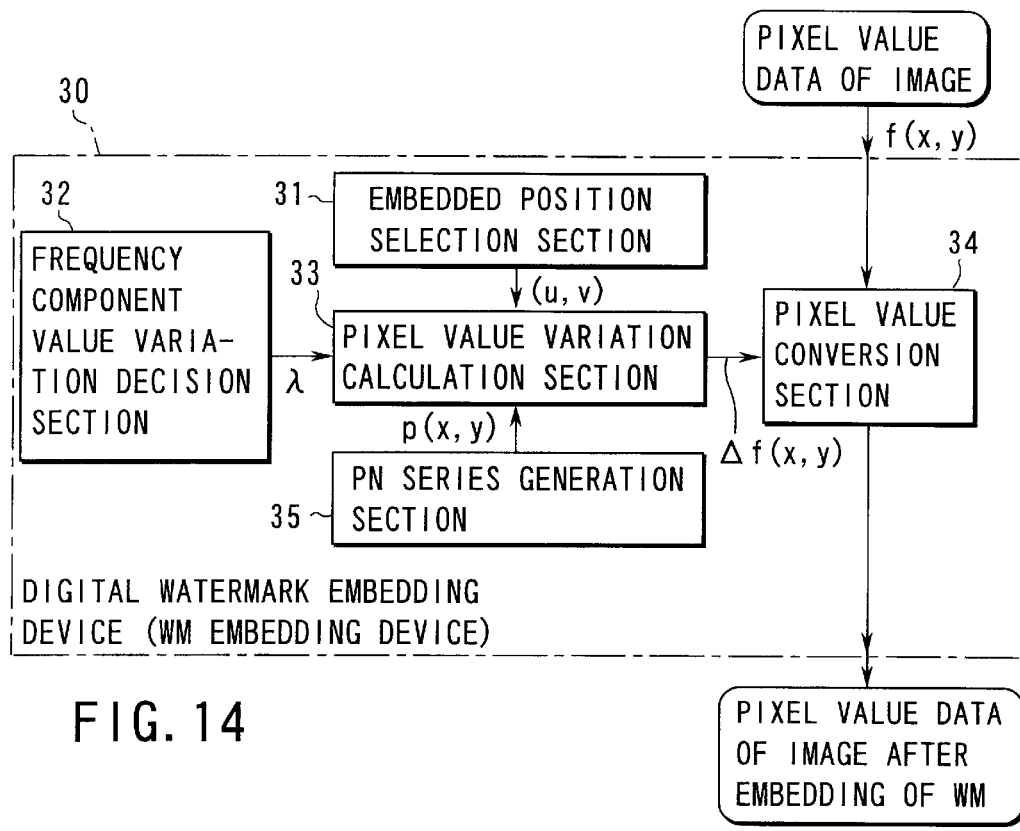
FIG. 14 is a block diagram showing the constitution of a digital watermark embedding device employing a spread spectrum technique in a second embodiment according to the present invention.

FIG. 14 is a block diagram showing the constitution of a digital watermark embedding device in the second embodiment according to the present invention.

In FIG. 14, a digital watermark embedding device (WM embedding device) 30 inputs the pixel value data of an image which a target for embedding of watermark information (WM information), embeds watermark information and then outputs the pixel value data on the image after embedding of the watermark information. The digital watermark embedding device 30 is characterized by adopting a constitution for embedding watermark information using PN sequence direct sequence spectrum spreading unlike the digital watermark embedding device 10 shown in FIG. 8 in the first embodiment.

The digital watermark embedding device 30 consists of an embedded position selection section 31, a frequency component value variation decision section 32, a pixel value variation calculation section 33, a pixel value conversion section 34 and a PN sequence generation section 35.

The embedded position selection section 31 is the same as the embedded position selection section 11 in FIG. 8 and determines a position (embedded position) in frequency domain into which watermark information is to be embedded without relaying on a frequency component value. Now, description will be given while it is assumed that there is one embedded position (u, v).

The frequency component value variation selection section 32 is the same as the frequency component value decision selection section 12 in FIG. 8 and determines to which value a frequency component value at each embedded position (u, v) selected by the embedded position selection section 11 is changed. In this case, a variation value (embedding intensity λ) indicating watermark information to be embedded is determined (selected). As described in the first embodiment with reference to FIG. 10, λ is set to be λ>|F(u, v)| for almost all embedded positions (u, v). Since the variation ΔF(u, v) of a frequency component value is ΔF(u, v)=±λ, the frequency component value after embedding of the watermark information becomes F(u, v)+ΔF(u, v)=±λ+F(u, v). If 1 is embedded, the frequency component value is λ+F(u, v)>0 or a positive value. If 0 is embedded, it is −λ+F(u, v)<0 or a negative value.

If the frequency component value variation decision section 32 determines the variation of the frequency component value at the embedded position (u, v) as ΔF(u, v), the frequency component value F(u, v) at the position (u, v) becomes F(u, v)+ΔF(u, v) after embedding of the watermark information.

The PN sequence generation section 35 generates random numbers by which pixel values are multiplied for direct sequence spectrum spreading. That is, the PN sequence generation section 35 generates a random value P(x, y) for each pixel (x, y) of an image which is a target for embedding of watermark information. If information of a plurality of bits is to be embedded into one block, both a method of embedding all watermark information into image data spectrum-spread by the same PN sequence and a method of embedding part of watermark information into data spectrum-spread by a plurality of different PN sequence, respectively may be applied.

The pixel value variation calculation section 33 calculates the variation Δ(f(x, y) of a pixel value at each point (x, y) in the pixel value domain of an image which is a target for embedding of watermark information, by inputting the embedded position (u, v) in frequency domain selected by the embedded position selection section 31, the variation ΔF(u, v) of the frequency component value selected by the frequency component value variation selection section 32 and the random value p(x, y) of PN sequence generated by the PN sequence generation section 35.

In this case, the pixel value variation calculation section 33 calculates the variation Δf(x, y) of a pixel value in accordance with the following Formula (3):

$$\Delta f(x, y) = p(x, y) \cdot A^{-1}(x, u) \cdot A^{-1}(y, u) \cdot \Delta F(u, v) \quad (3).$$

Figure 15:
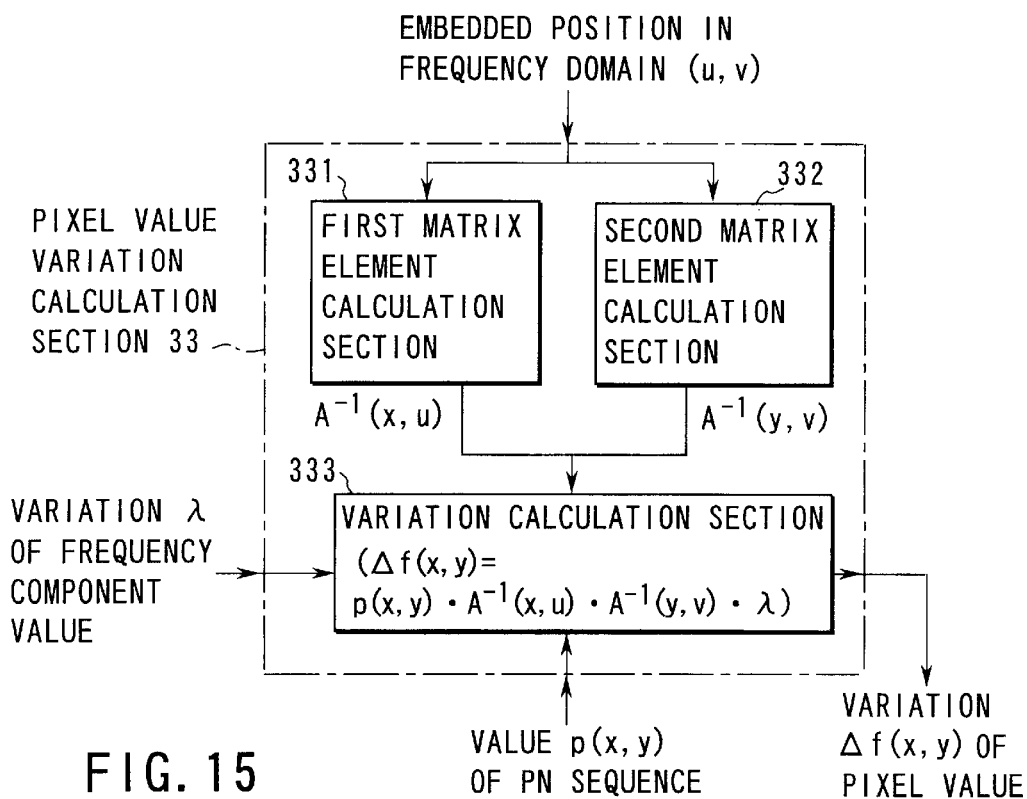
FIG. 15 is a block diagram showing an example of the constitution of a pixel value variation calculation section 33 shown in FIG. 14.

An example of the constitution of the pixel value variation selection section 33 conducting this calculation is shown in FIG. 15.

In the example of FIG. 15, the pixel value variation calculation section 33 consists of the first matrix element calculation section 331, the second matrix element calculation section 332 and a variation calculation section 333.

The first matrix element calculation section 331, which is the same as the first matrix element calculation section 131 shown in FIG. 11 in the first embodiment, sequentially inputs the embedded positions (u, v) in frequency domain selected by the embedded position selection section 31 and calculates the first matrix element $A^{-1}(x, u)$ of orthogonal transform. The second matrix element calculation section 332, which is the same as the second matrix element calculation section 132 shown in FIG. 11, sequentially inputs the embedded positions (u, v) in frequency domain and calculates the second matrix element $A_{-1}(y, v)$ of orthogonal transform.

The variation calculation section 333 inputs the calculation results of the first matrix element calculation section 331 and of the second matrix element calculation section 332, the variation ΔF(u, v) of a frequency component value determined by the frequency component value variation decision section 32 and the random value P(x, y) of PN sequence generated by the PN sequence generation section 35, calculates the variation Δf(x, y) of a pixel value at each point (x, y) in pixel value domain corresponding to an embedded position (u, v) in frequency domain in accordance with the above Formula (3). The variation Δf(x, y) of a pixel value at each point (x, y) in pixel value domain obtained by this variation calculation section 333 is fed to the pixel value conversion section 34 as the output of the pixel value variation calculation section 33.

Referring back to FIG. 14, the pixel value conversion section 34 converts image data (change a pixel value) in accordance with the variation Δf(x, y) of a pixel value at each point (x, y) in pixel value domain fed from the pixel value variation calculation section 33.

As described so far, in this embodiment, processing for embedding watermark information (or the determination of the watermark embedded position and that of the variation of a frequency component value after conducting orthogonal transform necessary for the processing) can be realized without conducting calculations for the orthogonal transform and inverse transform required for the conventional technique shown in FIG. 1 and those for direct sequence spectrum spreading and inverse spectrum spreading required for the conventional technique shown in FIG. 2. Therefore, if the digital watermark embedding device 30 in this embodiment is employed, it is possible to sequentially embed watermark information in a real-time manner without the need to prepare a large (mass-storage) buffer even if input images are applied in the form of stream data.

Figure 16:
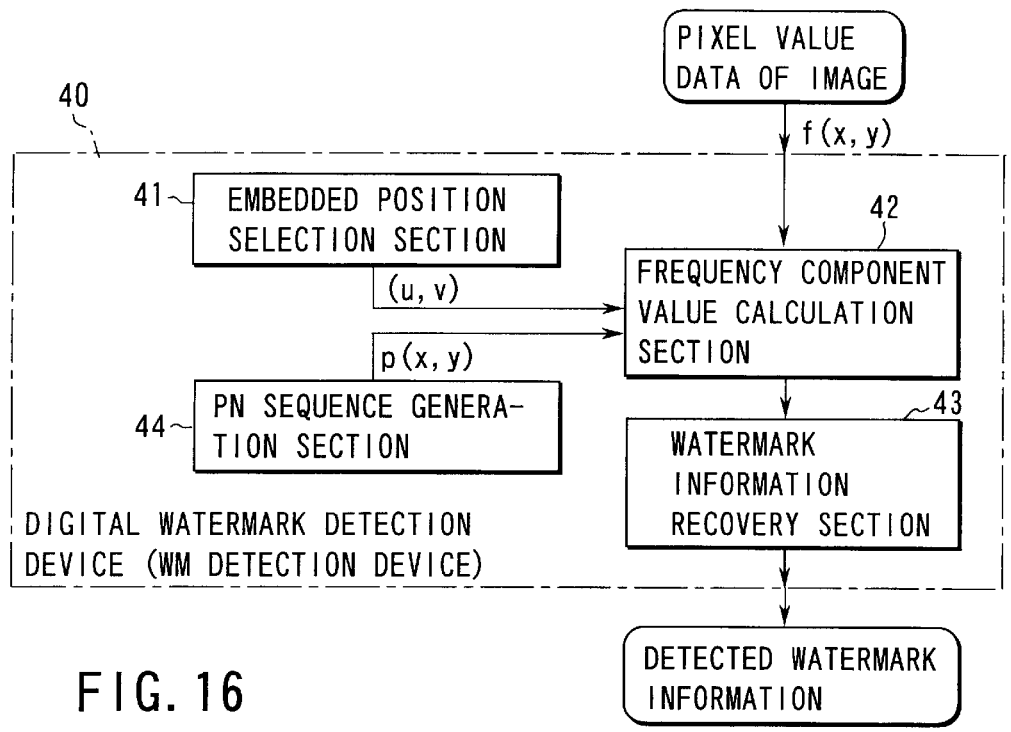
FIG. 16 is a block diagram showing the constitution of a digital watermark detection device employing the spread spectrum technique in the second embodiment according to the present invention.

FIG. 16 is a block diagram showing the constitution of a digital watermark information detection section in the second embodiment according to the present invention.

In FIG. 16, the digital watermark detection device (WM detection device) 40 inputs pixel value data of an image which is a target for embedding of watermark information and into which watermark information has been embedded by the digital watermark embedding device 30 shown in FIG. 14, and detects and outputs watermark information therefrom.

The digital watermark detection device 40 consists of an embedded position selection section 41, a frequency component value calculation section 42, a watermark information recovery section 43 and a PN sequence generation section 44.

The embedded position selection section 41, which has the same function as the embedded position selection section 31 in the digital watermark embedding device 30 shown in FIG. 14, selects the same position (u, v) as the embedded position (u, v) in frequency domain selected while watermark information is being embedded by the embedded position selection section 31. Information on the selected embedded position (u, v) is fed to the frequency component value calculation section 42.

The PN sequence generation section 44, which has the same function as that of the PN sequence generation section 35 in the digital watermark embedding device 30 shown in FIG. 14, generates the same PN sequence as that generated by the PN sequence generation section 35 during embedding of watermark information.

The frequency component value calculation section 42 calculates the frequency component value F(u, v) at the position (u, v) in frequency domain selected by the embedded position selection section 41 in accordance with the following Formula (4):

$$F(u, v) = \Sigma_x \Sigma_y p(x, y) \cdot A(u, x) \cdot A(v, y) \cdot f(x, y) \quad (4).$$

Where A(u, x) and A(v, y) are the matrix elements of orthogonal transform.

Figure 17:
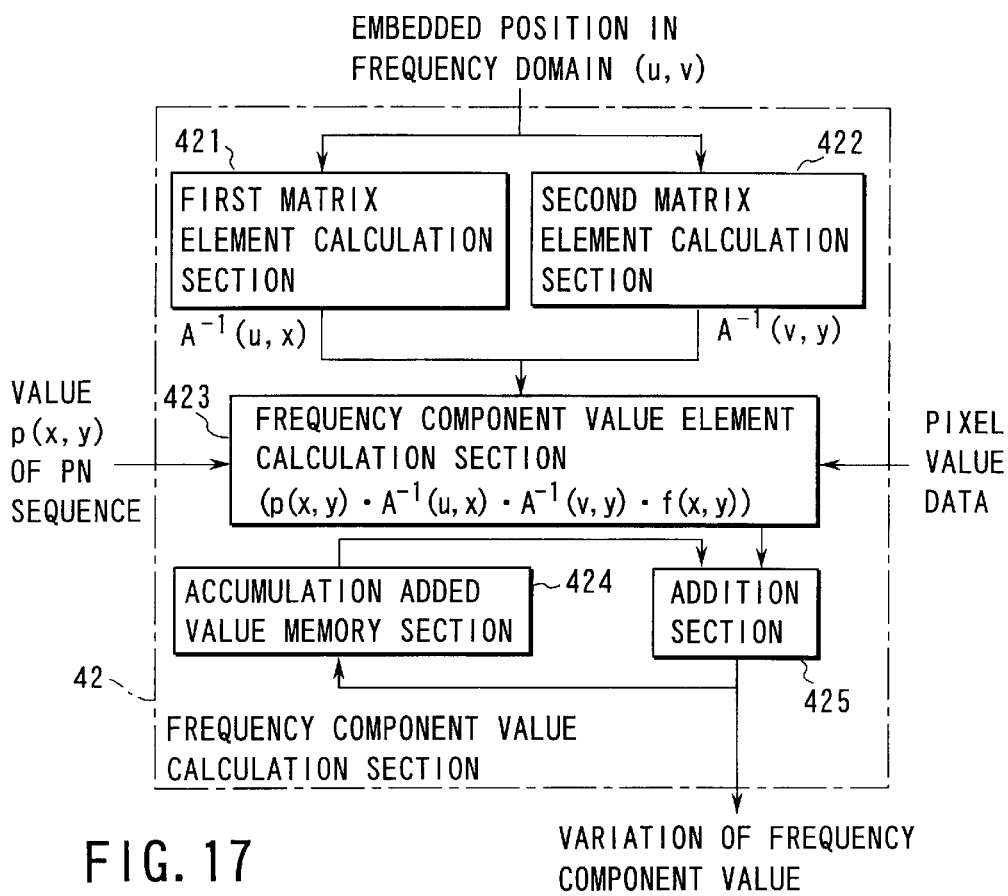
FIG. 17 is a block diagram showing an example of the constitution of a frequency component value calculation section 42 shown in FIG. 16.

An example of the constitution of the frequency component value calculation section 42 is shown in FIG. 17.

In the example of FIG. 17, the frequency component value calculation section 42 consists of the first matrix element calculation section 421, the second matrix element calculation section 422, a frequency component value element calculation section 423, an accumulation added value memory section 424 and an addition section 425 (corresponding to the first matrix element calculation section 221, the second matrix element calculation section 222, the frequency component value element calculation section 223, the accumulation added value memory section 224 and the addition section 225 included in the frequency component value calculation section 22 in the first embodiment, respectively).

The first matrix element calculation section 421 sequentially inputs embedded positions (u, v) in frequency domain selected by the embedded position selection section 41 and calculates the first matrix element A(u, x) of orthogonal transform. Likewise, the second matrix element calculation section 422 sequentially inputs embedded positions (u, v) in frequency domain and calculates the second matrix element A(v, y) of orthogonal transform.

The frequency component value element calculation section 423 inputs the calculation results of the first matrix element calculation section 421 and of the second matrix element calculation section 422, and, at the same time, sequentially inputs a pixel value f(x, y) at each point (x, y) in pixel value domain corresponding to the embedded position (x, y) in frequency domain and the random value p(x, y) of PN sequence generated by the PN sequence generation section 44. Every time the section 423 inputs those values, it calculates p(x, y)·A(u, x)·A(v, y)·f(x, y), i.e., the element of a frequency component value.

The accumulation added value memory section 424 is used to store the sum (accumulation value) of p(x, y)·A(u, x)·A(v, y)·f(x, y)·f(x, v) calculated by the frequency component value element calculation section 423 to date.

Every time p(x, y)·A(u, x)·A(v, y)·f(x, y) is calculated by the frequency component value element calculation section 423, the added section 425 adds the calculation result of the section 423 and the content of the accumulation added value memory section 424 at that moment and obtains the sum (accumulation value) of p(x, y)·A(u, x)·A(v, y)·f(x, y) calculated by the frequency component value calculation section 423 until that moment.

In this way, if the pixel values f(x, y) of all pixels in the embedding target block have been inputted, p(x, y)·A(u, x)·A(v, y)·f(x, y) for the final pixel value f(x, y) has been calculated by the frequency component value element calculation section 423 and the calculation result of the section 423 and the content of the accumulation added value memory section 424 have been added by the added section 425, then the addition result $\Sigma_x \Sigma_y$ p(x, y)·A(u, x)·A(v, y)·f(x, y) is outputted, as a frequency component value F(u, v) at the embedded position (u, v) selected by the embedded position selection section 41, from the frequency component value calculation section 42 to the watermark information recovery section 43.

The watermark information recovery section 43 recovers the embedded watermark information by the frequency component value F(u, v) outputted from the frequency component value calculation section 42. This recovery can be realized by estimating that 1 is embedded as for, for example, F(u, v)>0 and that 0 is embedded as for F(u, v)<0.

[Third Embodiment]

Figure 18A:
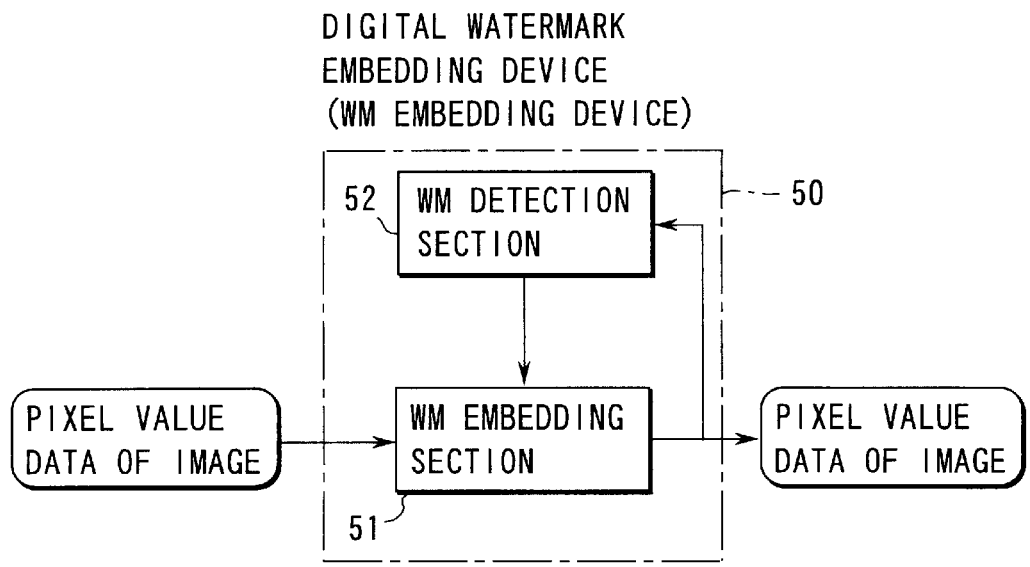
FIGS. 18A and 18B are block diagrams showing the constitution of a digital watermark embedding device for embedding adaptive watermark information based on the detection of watermark information in a third embodiment according to the present invention.
Figure 18B:
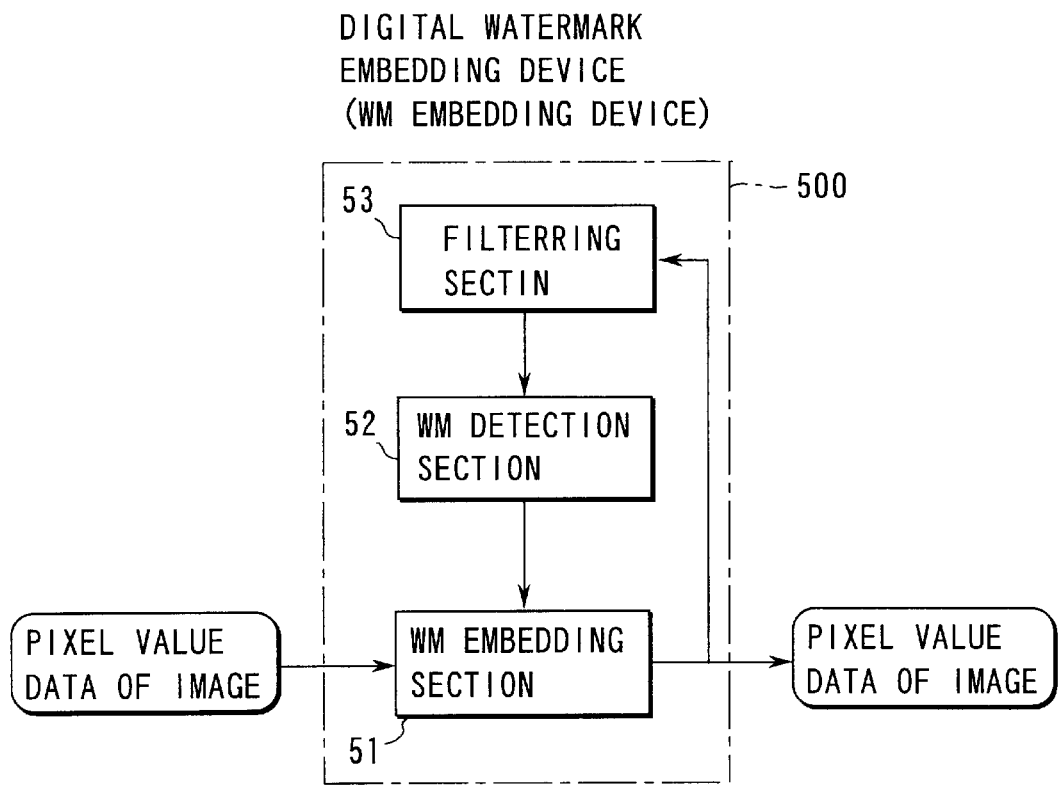

FIGS. 18A and 18B are block diagrams showing the constitution of a digital watermark embedding device in the third embodiment according to the present invention.

A digital watermark embedding device (WM embedding device) 50 shown in FIG. 18A is characterized by comprising a digital watermark embedding section (WM embedding section) 51 corresponding to the digital watermark embedding device 10 in the first embodiment or the digital watermark embedding device 30 in the second embodiment and a digital watermark detection section (WM detection section) 52 corresponding to the digital watermark detection section 20 in the first embodiment or the digital watermark detection section 40 in the second embodiment, to adaptively determine a parameter such as embedding intensity necessary for watermark embedding processing and thereby to realize more assured detection of watermark information and embedding of watermark information having the less perceived influence.

If watermark information is embedded by the digital watermark embedding section 51, the digital watermark detection section 52 instantly detects corresponding watermark information from the image into which the watermark information has been embedded. As can be easily understood from the constitution of the digital watermark detection device 20 in the first embodiment (see FIG. 12) or that of the digital watermark detection device 40 in the second embodiment (see FIG. 16), the frequency component value F(u, v) at the watermark embedded position (u, v) is calculated (by the frequency component value calculation section 22 in FIG. 12 or the frequency component value calculation section 42 in FIG. 16).

Figure 19A:
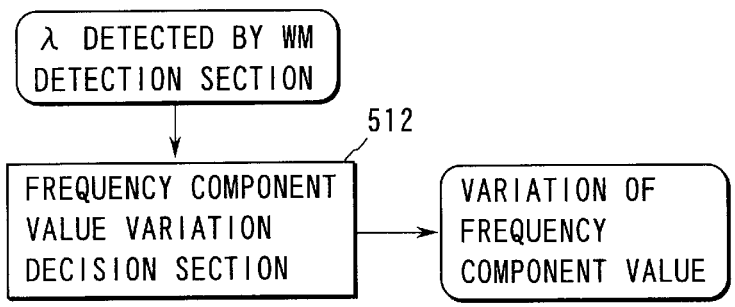
FIGS. 19A and 19B are views for describing the function of a frequency component value variation decision section 512 provided in a digital watermark embedding section 51 shown in FIGS. 18A and 18B and determining a frequency component value variation based on feedback information.

Then, as shown in, for example, FIG. 19A, the frequency component value is fed back to a frequency component value variation decision section 512 in the digital watermark embedding section 51 (corresponding to the frequency component value variation decision section 12 in FIG. 8 or the frequency component value variation decision section 32 in FIG. 14).

The frequency component value variation decision section 512 adaptively changes the variation value of a frequency component value at an embedded position (u, v), that is, watermark information embedding intensity based on the frequency component value fed back from the digital watermark detection section 52.

As information fed back to the frequency component value variation decision section 512 in the digital watermark embedding section 51 from the digital watermark detection section 52, not a frequency component value but watermark information recovered based on the frequency component value may be fed back. In that case, the frequency component value variation decision section 512 may adaptively change the variation value of a frequency component value at an embedded position (u, v), that is, watermark information embedding intensity, based on the watermark information fed back by the digital watermark detection section 52.

In this way, it is possible to increase the probability of accurate detection of newly embedded watermark information by causing the digital watermark detection section 52 to instantly detect corresponding watermark information from the image into which the watermark information has been embedded by the digital watermark embedding section 51, to feed back the detected watermark information itself or the frequency component value used for the detection (recovery) of the watermark information to the digital watermark embedding section 51 and by adaptively changing the variation (embedding intensity) of a frequency component value for later watermark information embedding processing.

If operation (e.g., image compression/expansion) aimed at the image into which watermark information has been embedded by the digital watermark embedding section 51 is expected in advance, a filtering section 53 conducting filtering operation (e.g., compression/expansion) with the operation being modeled, may be provided as shown in the digital watermark embedding device (WM embedding device) 500 shown in, for example, FIG. 18B, the digital watermark detection section 52 may conducts detection in response to the filtering result of the filtering section 53 and the detection result may be fed back to the digital watermark embedding section 51.

In addition, the result of evaluating the visual (perceived) influence on the image into which watermark information has been embedded other than the watermark information detection result can be adapted as information fed back to the digital watermark detection section 51. An example of such a constitution is shown in FIGS. 20A and 20B.

Figure 19B:
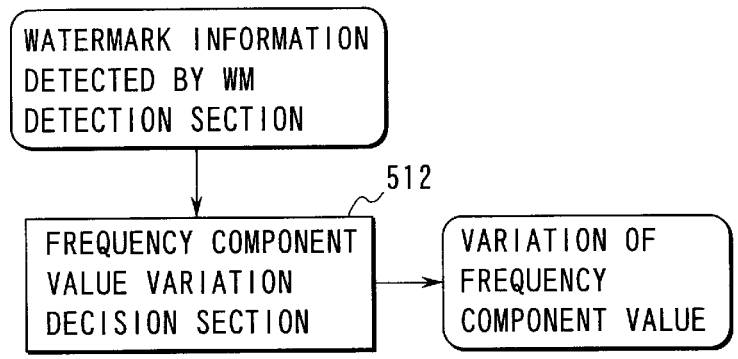
Figure 20A:
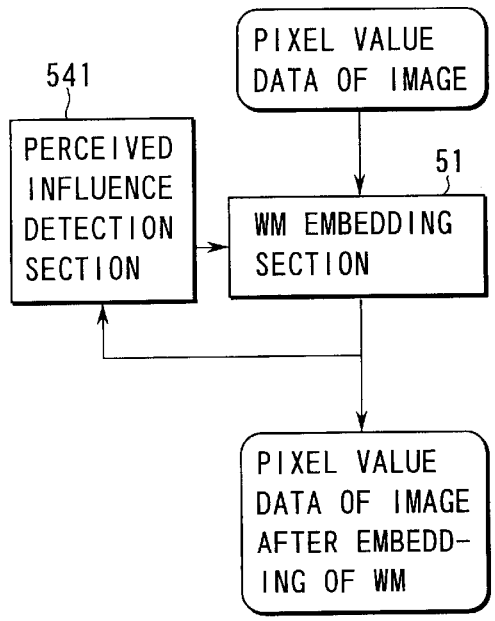
FIGS. 20A and 20B are block diagrams showing an example of the constitution of a digital watermark embedding device for embedding watermark information by feeding back the distortion of an image and adaptively changing a frequency component value variation.

In the constitution of FIG. 20A, a perceived information detection section 542 inputting the pixel value of the image into which the watermark information outputted from the digital watermark embedding section 51 has been embedded, and detecting and evaluating the perceived influence (visual distortion compared with the original image before embedding of watermark information) on the image, is provided. The evaluation result of the perceived influence detection section 541 is fed back to the digital embedding section 51 (e.g., the frequency component value variation decision section 512 in the section 51 shown in FIGS. 19A and 19B).

Figure 20B:
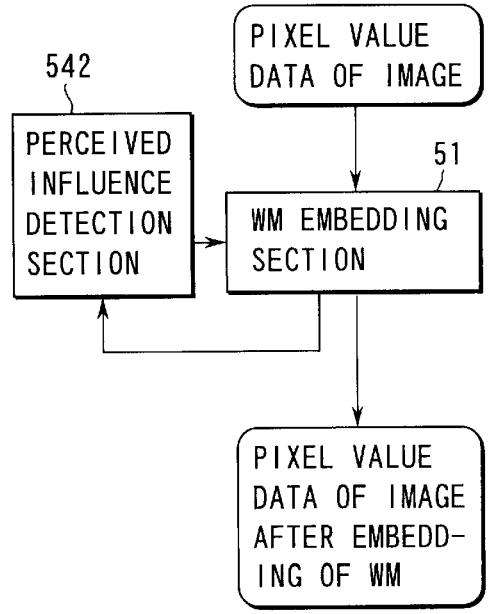

Meanwhile, in the constitution of FIG. 20B, a perceived influence detection section 542 inputting the variation of a frequency component value determined by, for example, the frequency component value variation decision section 512 shown in FIGS. 19A and 19B in the digital watermark embedding section 51 (i.e., parameter used for watermark information embedding in the digital watermark embedding section 51) and detecting and evaluating the visual influence (distortion) on the image into which watermark influence has been embedded by the digital watermark embedding section 51, is provided. The evaluation result of the perceived influence detection section 542 is fed back to the digital watermark embedding section 51 (or the frequency component value variation decision section 512 in the section 51 shown in, for example, FIGS. 19A and 19B).

An evaluation method using an SN ratio or an evaluation method based on a perceived model can be applied to the evaluation of perceived influence in the perceived influence detection section 541 or 542.

[Fourth Embodiment]

In the digital watermark embedding devices in the preceding first and second embodiments, an embedded position and embedding intensity are set to be dependent on a frequency component value. In case of the determination of embedding intensity which requires obtaining frequency component values at many positions in frequency domain, however, complexity of computation is large and, therefore, it is difficult to select a large block size. Considering this, this embodiment adopts a method in which an embedded position does not depend on frequency component values and only embedding intensity depends on those at a few points.

Figure 21:
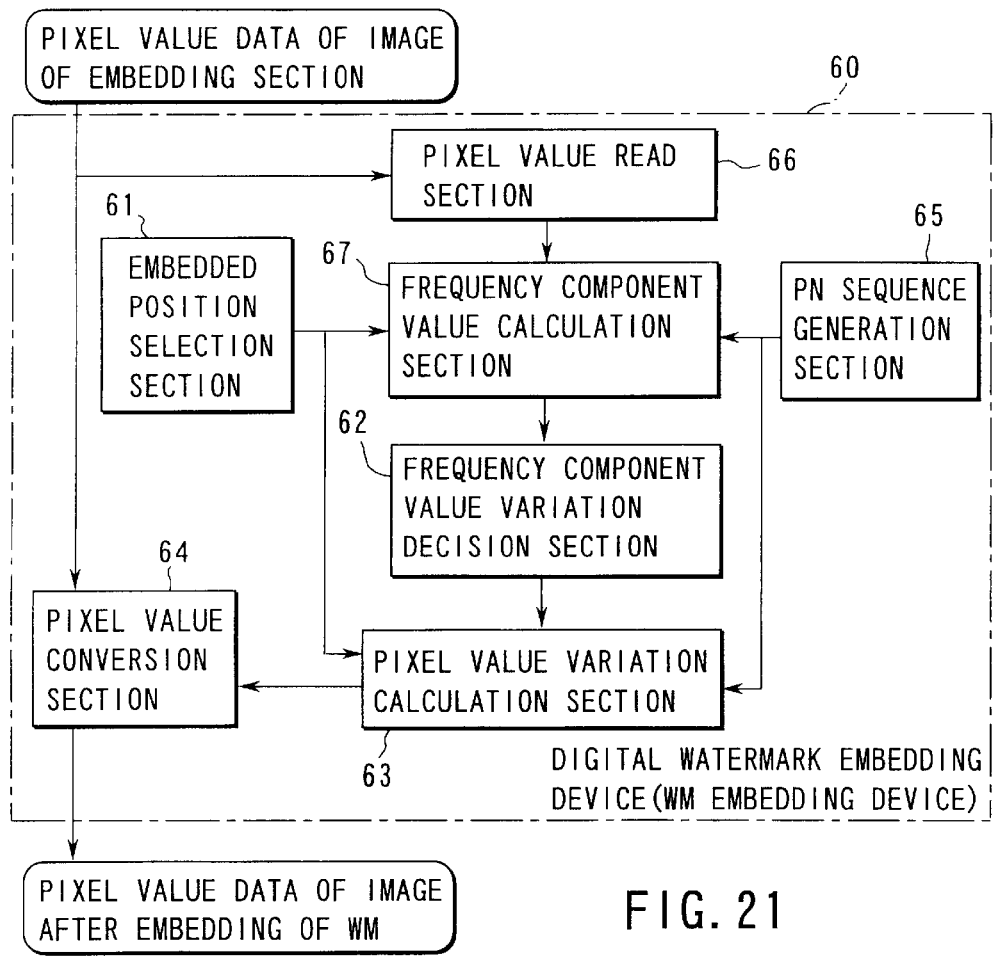
FIG. 21 is a block diagram showing the constitution of a digital watermark embedding device having an embedding intensity decision function based on a frequency component value at an embedded position in a fourth embodiment according to the present invention.

FIG. 21 is a block diagram showing the constitution of a digital watermark embedding device in the fourth embodiment according to the present invention.

In FIG. 21, a digital watermark embedding device (WM embedding device) 60 is designed to calculate a frequency component value at a watermark information embedded position and determine embedding intensity based on the value. The digital watermark embedding device 60 consists of an embedded position selection section 61, a frequency component value variation decision section 62, a pixel value variation calculation section 63, a pixel value conversion section 64, a PN sequence generation section 65, a pixel value read section 66 and a frequency component value calculation section 67.

The pixel value read section 66 reads a pixel value f(x, y) at each point (x, y) in pixel value domain of an image which is a target for embedding of watermark information.

The frequency component value calculation section 67 corresponds to the frequency component value calculation section 42 in the digital watermark detection device 40 shown in FIG. 16 in the second embodiment. The section 67 calculates a frequency component value F(u, v) at the embedded position (u, v) determined by the embedded position selection section 61 (corresponding to the embedded position selection section 41 in FIG. 16), based on the pixel value f(x, y) at each point (x, y) in pixel value domain read by the pixel value read section 66 and the random value p(x, y) for the pixel (x, y) generated by the PN sequence generation section 65 (corresponding to the PN sequence generation section 44 shown in FIG. 16), in accordance with the Formula (4). If the PN sequence generation section 65 is not provided, that is, if direct sequence spectrum spreading using PN sequence is not used, the frequency component value F(u, v) may be calculated according to the Formula (2).

The frequency component value variation decision section 62 determines (selects) the variation $\Delta F(u, v)$ of the frequency component value at the embedded position (u, v) based on the frequency component value F(u, v) at this embedded position (u, v).

The pixel value variation calculation section 63 (which corresponds to the pixel value variation calculation section 33 shown in FIG. 14 in the second embodiment) calculates the variation $\Delta f(x, y)$ of a pixel value at each point (x, y) in pixel value domain of an image which is a target for embedding of watermark information, by inputting the embedded position (u, v) in frequency domain selected by the embedded position selection section 61, the variation $\Delta F(u, v)$ of a frequency component value determined by the frequency component value variation decision section 62 and the random value p(x, y) of PN sequence generated by the PN generation section 65.

The pixel value conversion section 64 converts image data in accordance with the variation $\Delta f(x, y)$ of a pixel value at each point (x, y) in pixel value domain obtained by the pixel value variation calculation section 63.

The constitution of FIG. 21 is characterized in that the frequency component value variation decision section 62 can set embedding intensity so that the perceived influence on the image is less and the variation of a frequency component value due to embedding is small while using information on general properties about the variation of a frequency component value under various operations. The characteristics will be described with reference to FIGS. 22 and 23.

Figure 22:
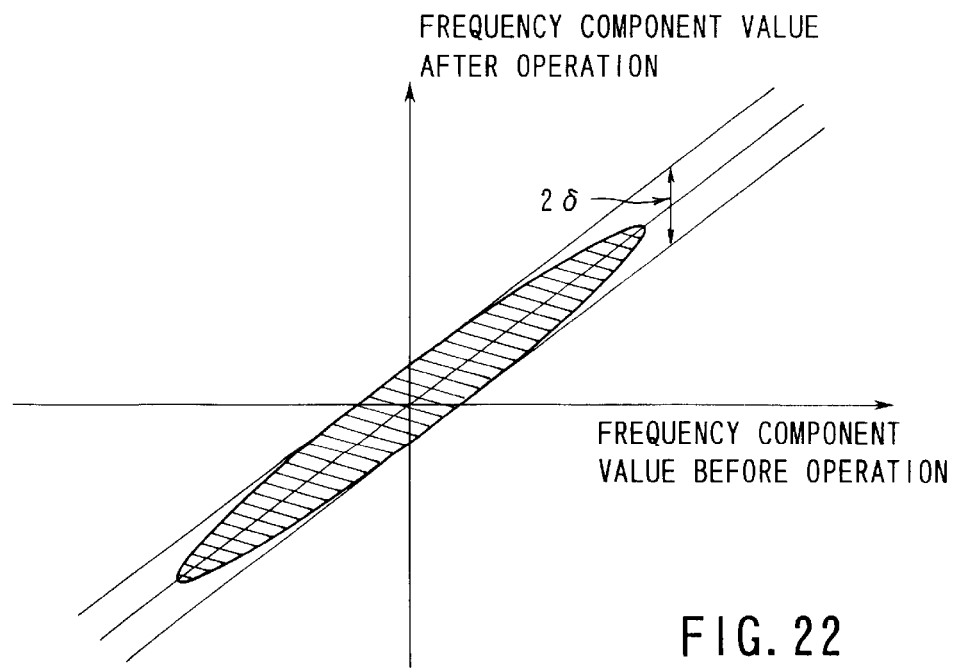
FIG. 22 shows the variation of the frequency component value of an image by compression/expansion operation.

FIG. 22 shows how the frequency component value of an image varies by compression and expansion operation.

As can be seen from FIG. 22, the variation of every frequency component value almost falls within a range of $\pm\delta$. Since this property is seen for almost all image data, the variations of almost all frequency component values of any image fall within the range of $\pm\delta$ as long as a variation $\delta$ having a certain degree of magnitude is set.

By using this property, the frequency component value variation decision section 62 can determine $\delta - F(u, v)$ in case of embedding 1 and $-\delta - F(u, v)$ in case of embedding 0 as variations at a time when the digital watermark embedding device 60 shown in FIG. 21 embeds watermark information into target data. In this case, the frequency component value after embedding, if an error due to round-off during embedding is excluded from the value, is $\delta$ in case of embedding 1 and $-\delta$ in case of embedding 0. The value $\delta$ is normally lower than the embedding intensity $\lambda$ set in the first or second embodiment. While the intensity $\lambda$ needs to be set higher than a typical frequency component value, $\delta$ can be set as a typical frequency component value, which makes it possible to reduce perceived influence on the image.

Figure 23:
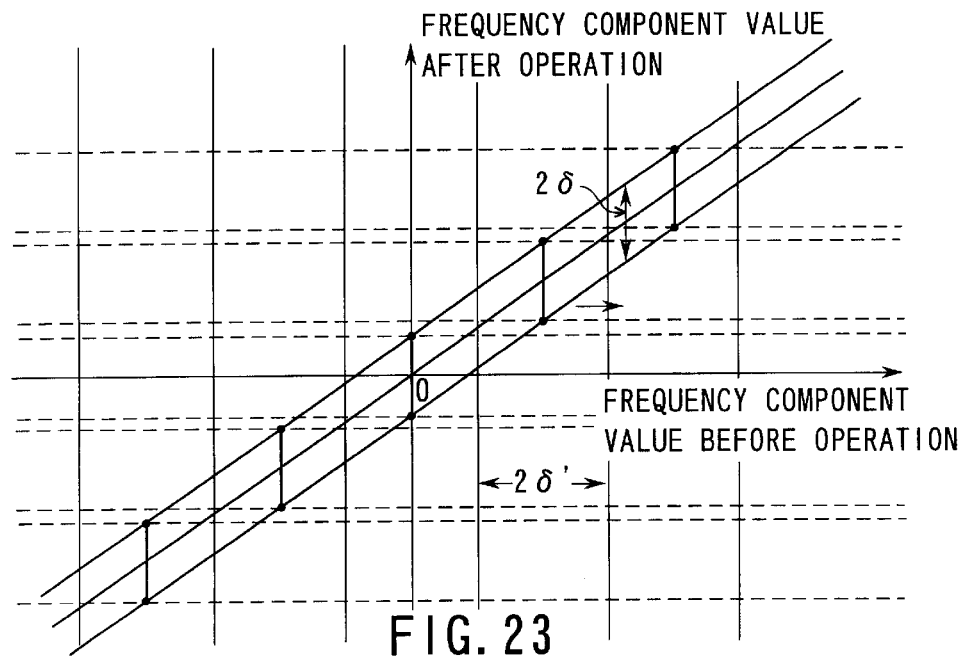
FIG. 23 is a view for describing how to apply the variation of a frequency component value to decrease perceived influence on an image.

FIG. 23 shows how to set the variation of a frequency component value to reduce perceived influence on an image as much as possible.

In FIG. 23, it is assumed that $\delta'$ is set slightly higher than $\delta$, the range of a frequency component value is divided into partial regions at intervals of $2\delta'$, and that the i-th partial region, for example, is between $(2i-1)\delta'$ and $(2i+1)\delta'$.

In this case, the frequency component value variation decision section 62 selects $(2i+1)\delta' - F(u, v)$ if 1 is embedded and i is an even number and $(2i-1)\delta' - F(u, v)$ if 1 is embedded and i is an odd number, and selects $(2i-1)\delta' - F(u, v)$ if 0 is embedded and i is an even number and $(2i+1)\delta' - F(u, v)$ if 0 is embedded and i is an odd number.

Now, for the digital watermark detection device to detect corresponding watermark information from the image into which watermark information has been embedded by the digital watermark embedding device 60 having a frequency component value variation decision function as stated above, a watermark information recovery section corresponding to the watermark information recovery section 43 shown in FIG. 16 may obtain a value of i in (2i+1)δ' which is the proximate frequency component value at the embedded position and judge that 1 is embedded if i is an odd number and 0 is embedded if i is an even number. In this method, the absolute value of the variation of a frequency component value during embedding can be suppressed up to 2δ' at most.

The above description concerns a case where the present invention is applied to the digital watermark embedding device. However, it is also possible to apply the present invention to a digital watermark embedding/detection device having both the digital watermark embedding function and the detection function.

Figure 24:
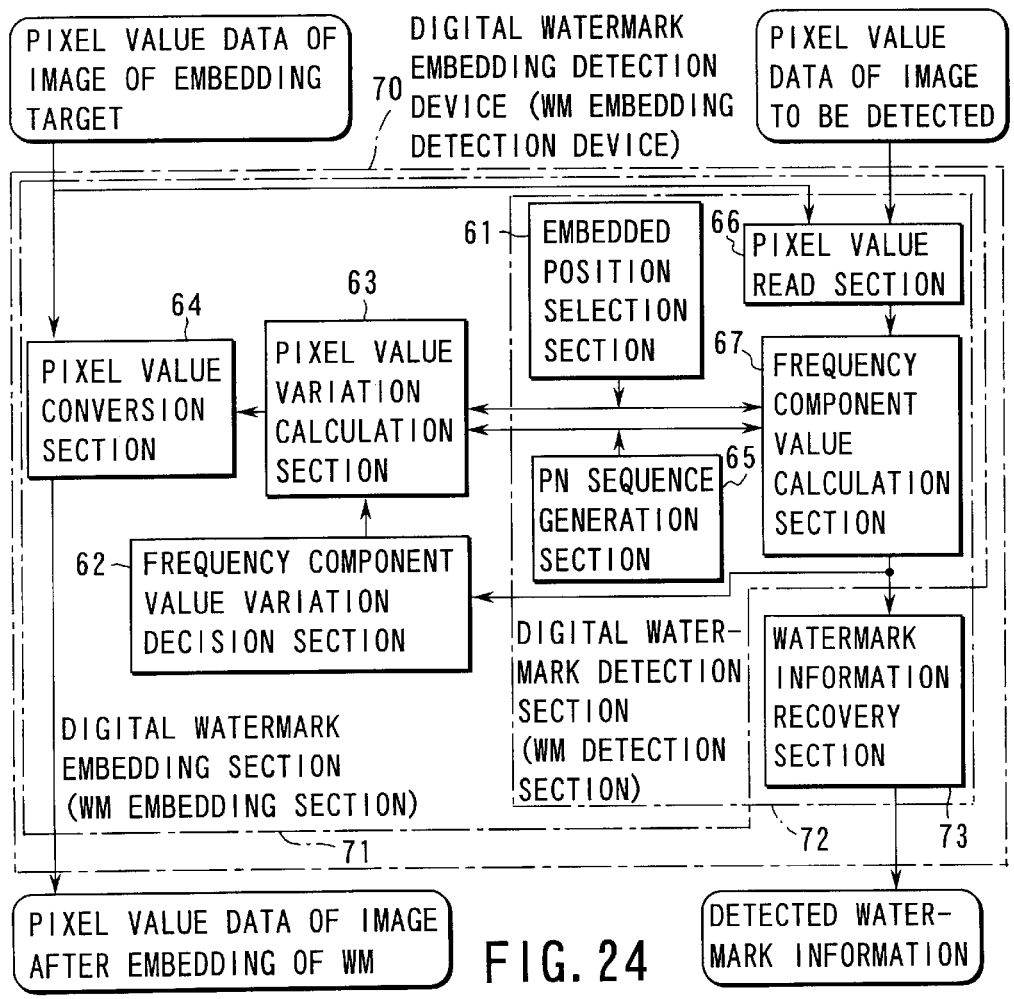
FIG. 24 is a block diagram showing the constitution of a digital watermark embedding/detection device having a digital watermark detection function in addition to the same digital watermark embedding function as that of the digital watermark embedding device shown in FIG. 21.

FIG. 24 is a block diagram showing the constitution of a digital watermark embedding/detection device (WM embedding/detection device) 70 having a digital watermark detection function as well as the same digital watermark embedding function as that of the digital watermark embedding device 60 shown in FIG. 21. It is noted that the same constituent elements are denoted by the same reference symbols as those in FIG. 21.

In FIG. 24, a digital watermark embedding section (WM embedding section) 71 corresponding to the digital watermark embedding device 60 shown in FIG. 21 consists of, as in the case of the digital watermark embedding device 60, an embedded position selection section 61, a frequency component value variation decision section 62, a pixel value variation calculation section 63, a pixel value conversion section 64, a PN sequence generation section 65, a pixel value read section 66 and a frequency component value calculation section 74.

A digital watermark detection section (WM detection section) 72 consists of an embedded position selection section 61, a PN sequence generation section 65, a pixel value read section 66, a frequency component value calculation section 67 and a watermark information recovery section 73 (corresponding to the watermark information recovery section 43 shown in FIG. 16). The embedded position selection section 61, the PN sequence generation section 65, the pixel value read section 66 and the frequency component value calculation section 67 are shared between the digital watermark embedding section 71 and the digital watermark detection section 72.

As stated above, by employing the constitution in which part of the functions of the digital watermark detection section 72 are shared between the section 72 and the digital watermark embedding device 71, it is possible to prevent the digital watermark embedding device 71 and the digital watermark detection device 72 from having overlapped functions. This is similar to a constitution without a PN sequence generation section 65. In the latter case, the digital watermark embedding device 71 and the digital watermark detection device 72 may share the embedded position selection section, the pixel value read section and the frequency component value calculation section therebetween. In addition, if a device which functions as both the digital watermark embedding device 10 shown in FIG. 8 and the digital watermark detection device 20 shown in FIG. 20, is to be realized, or if a device which functions as both the digital watermark embedding device 30 shown in FIG. 14 and the digital watermark detection device 40 shown in FIG. 16, is to be realized, then the embedded position selection section may be shared between the sections 10 and 20 and the embedded position selection section and the PN sequence generation section may be shared between the sections 30 and 40.

[Fifth Embodiment]

Figure 25:
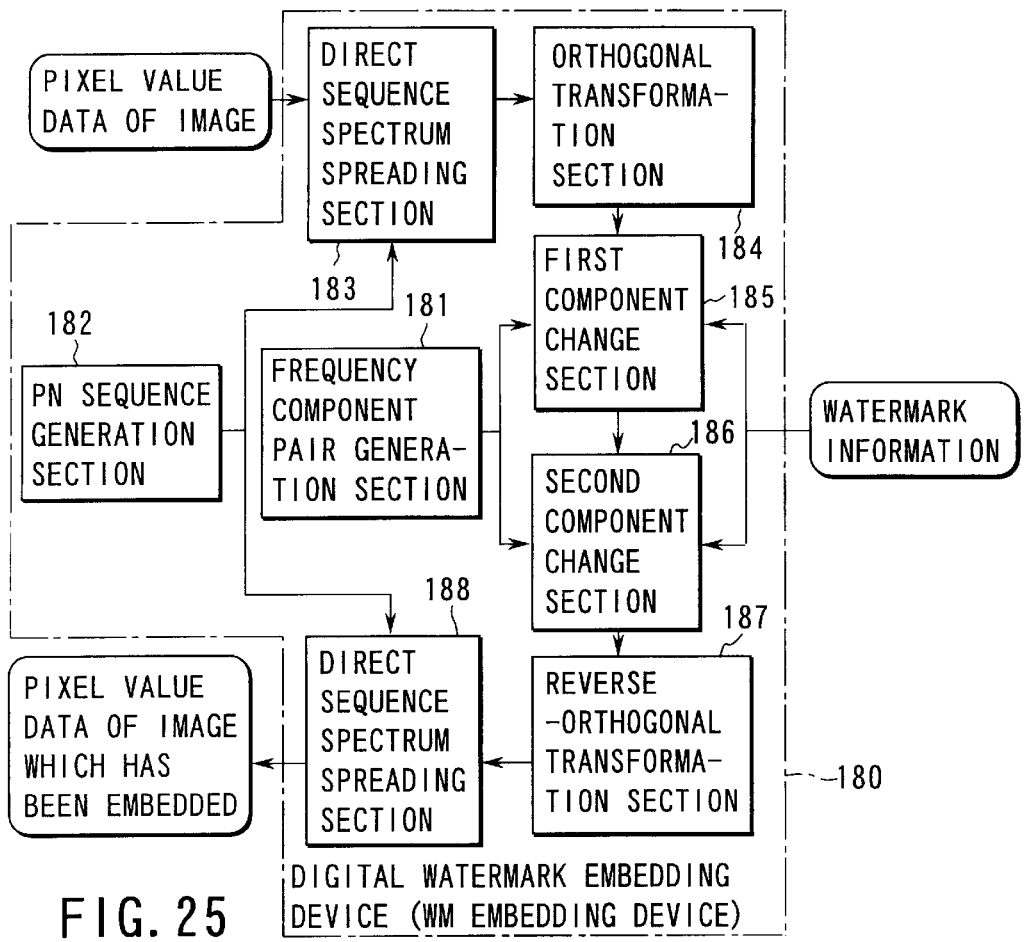
FIG. 25 is a block diagram showing the constitution of a digital watermark embedding device employing an advanced patchwork method in a fifth embodiment according to the present invention.

FIG. 25 is a block diagram showing the constitution of a digital watermark embedding device in the fifth embodiment according to the present invention.

In FIG. 25, a digital watermark embedding device (WM embedding device) 180 employs a technique for embedding watermark information by means of an advanced patchwork method. The device 180 consists of a frequency component pair generation section 181, a PN sequence generation section 182, a direct sequence spectrum spreading section 183, an orthogonal transformation section 184, the first component change section 185, the second component change section 186, a reverse-orthogonal transformation section 187 and a direct sequence spectrum spreading section 188.

The frequency component pair generation section 181 determines (generates) a pair of positions <(au, av), (bu, bv)> in frequency domain into which watermark information should be embedded, irrespectively of a frequency component value.

The PN sequence generation section 182 generates pseudo-random numbers (pseudo-random number series) by which a pixel value at each point in pixel value domain of an image which is a target for watermark information embedding is multiplied for direct sequence spectrum spreading.

The direct sequence spectrum spreading section 183 outputs the direct sequence spectrum spreading pixel value data by multiplying the image value data of the image by the pseudo-random number generated by the PN sequence generation section 183.

The orthogonal transformation section 184 conducts orthogonal transform to the pixel value data spectrum-spread by the direct sequence spectrum spreading section 183 and generates frequency component data.

The first component change section 185 changes (increments if watermark information 1 is embedded and decrements if 0 is embedded in this case) a frequency component value a, generated by the orthogonal transformation section 184, in the first component (au, av) in the frequency component pair at each embedded position generated by the frequency component pair generation section 181, by, for example, a certain positive value Δ using a watermark information value.

On the other hand, the second component change section 186 changes (decrements if watermark information 1 is embedded and increments if 0 is embedded in this case) a frequency component value b, generated by the orthogonal transformation section 184, in the second component (bu, bv) of the frequency component pair at each embedded position generated by the frequency component pair generation section 181, by a positive value Δ in opposite direction to that of the first component change section 185, using a watermark information value.

The reverse-orthogonal transformation section 187 conducts reverse-orthogonal transformation to the frequency component value data after change by the first component change section and the second component change section, and outputs pixel value data.

The direct sequence spectrum spreading section 188 conducts de-spread to multiply the pixel value data outputted from the reverse-orthogonal transformation section 187 by the pseudo-random number generated by the PN sequence generation section 182 and outputs pixel value data into which watermark information has been embedded.

As described above, in this embodiment, direct sequence spectrum spreading is conducted to the pixel value data which is a target for watermark information embedding by the direct sequence spectrum spreading section 183 and then orthogonal transformation is conducted thereto by the orthogonal transformation section 184. Therefore, the frequency component value data obtained by the orthogonal transformation of the orthogonal transformation section 184 has almost statistically uniform distribution close to normal distribution. Due to this, even if the number of frequency component pairs at embedded positions selected at random by the frequency component pair generation section 181 is small, the statistically important difference is seen between the distributions of the frequency component values of the first and second components in the pair after change operation of the first component change section 185 and the second component change section 186, thereby making it possible to carry out significant watermark embedding.

Figure 26:
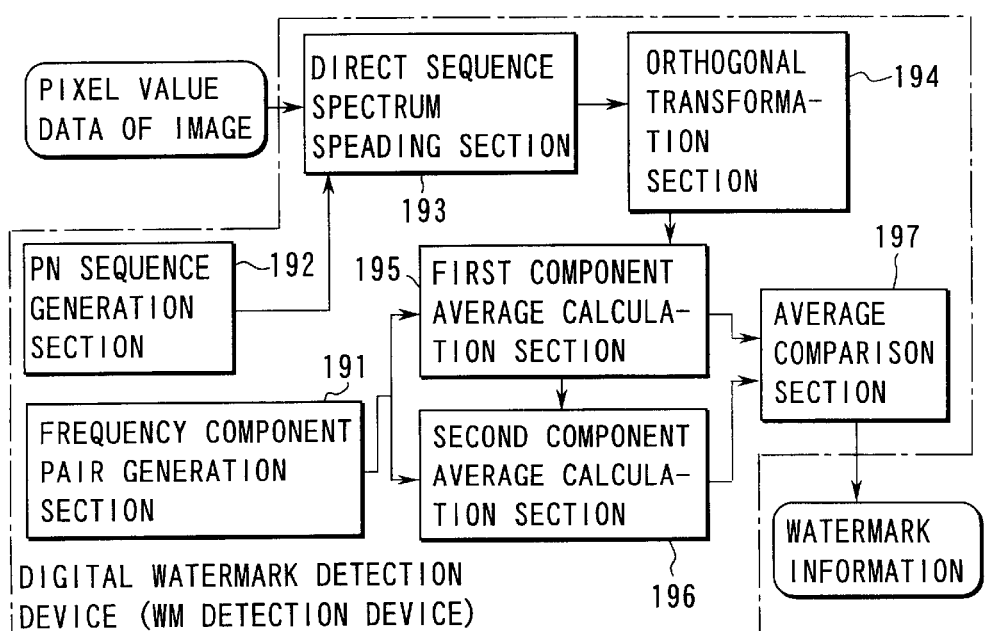
FIG. 26 is a block diagram showing the constitution of a digital watermark detection device for detecting watermark information embedded by employing the advanced patchwork method in the fifth embodiment according to the present invention.

FIG. 26 is a block diagram showing the constitution of a digital watermark detection device in the fifth embodiment according to the present invention.

In FIG. 26, a digital watermark detection device (WM detection device) 190 inputs the pixel value data of an image which is a target for watermark information embedding and into which watermark information is embedded by the digital watermark embedding device 180 shown in FIG. 25, and detects and outputs watermark information therefrom.

The digital watermark detection device 190 consists of a frequency component pair generation section 191, a PN sequence generation section 192, a direct sequence spectrum spreading section 193, an orthogonal transformation section 194, the first component average calculation section 195, the second component average calculation section 196 and an average comparison section 197.

The frequency component pair generation section 191 determines (generates) a pair of positions in frequency domain into which watermark information is embedded by the digital watermark embedding device 180 shown in FIG. 25, irrespectively of a frequency component value.

The PN sequence generation section 192 generates a pseudo-random number (or pseudo-random number series) by which a pixel value at each point in pixel value domain of an image which is a target for the detection of watermark information is multiplied for direct sequence spectrum spreading.

The direct sequence spectrum spreading section 193 multiplies the image value data of the image by the pseudo-random number generated by the PN sequence generation section 192 and thereby outputs direct sequence spectrum spreading pixel value data.

The orthogonal transformation section 194 conducts orthogonal transform to the pixel value data spectrum-spread by the direct sequence spectrum spreading section 193 and generates frequency component value data.

The first component average calculation section 195 calculates the average of frequency component values, generated by the orthogonal transformation section 194, of the first component in the frequency component pair at each position generated by the frequency component pair generation section 191. The second component average calculation section 196 calculates the average of frequency component values, generated by the orthogonal transformation section 194, of the second component in the frequency component pair at each position generated by the frequency component pair generation section 191.

The average comparison section 197 compares two averages calculated by the first component average calculation section 195 and the second component average calculation section 196. The section 197 judges that 1 is embedded if the average of the frequency component values of the first component is higher than that of the frequency component values of the second component and that 0 is embedded if the average of the frequency component values of the second component is higher, thereby detecting (recovering) the embedded watermark information.

The above description concerns a case where the present invention is applied to the embedding of watermark information into an image and to the detection of watermark information from the image. The present invention is also applicable to the embedding and detection of watermark information into and from digital literary properties such as sound and music, other than an image.

The present invention can be applied to extraction of use control information, in addition, re-embedding (remarking) of digital watermark information based on the information and superimposition of another watermark information to the information etc.

An example of applying the present invention to the copy control of DVD (digital video disk) for example will be explained.

Usually, to prevent an illegal copy, copy control information is embedded to DVD etc. This copy control information is embedded into the disk as digital watermark information, and, for example, according to embedded information, the control is performed such as copy-enabled, copy-disabled, or copy-enabled for predetermined numbers (e.g., once, twice, . . . ).

In this case, to reflect copy control information accurately, it is necessary to read copy control information on contents which are the copy target and rewrite copy control information on copied contents appropriately.

FIG. 27 is a block diagram which shows the outline configuration of digital watermark embedding and detection device which rewrites copy control information, generates new copy control information based on the copy control information, and embeds the new copy control information. In FIG. 27, since the configuration of digital watermark device 10 (or 30 etc.) and digital watermark detection device 20 (or 40 etc.) is similar to the embodiment described before, the explanation will be omitted.

In FIG. 27, digital watermark in contents read from DVD is read by digital watermark detection device 20. If copy control information of read digital watermark information is information that it is possible to copy it only once, digital watermark detection device 20 sends the information to copy controller 80. Copy controller 80 sends copy control information rewritten based on copy control information to digital watermark embedding device 10, and digital watermark embedding device 10 embeds this copy control information to contents at the copy destination as digital watermark information. At this time, digital watermark information may be embedded without erasing digital watermark information on the copy origin and without overlapping it, and may be embedded after erasing digital watermark information on the copy origin.

It is noted that the constitution of the digital watermark embedding device 10 in FIG. 8 and that of the digital watermark detection device 20 in FIG. 12 employed in the first embodiment, the constitution of the digital watermark embedding device 30 in FIG. 14 and that of the digital watermark detection device 40 in FIG. 16 employed in the second embodiment, the constitutions of the digital watermark embedding devices 50 and 500 in FIGS. 18A and 18B employed in the third embodiment, the constitution of the digital watermark embedding device 60 in FIG. 21 and that of the digital watermark embedding/detection device in FIG. 24 employed in the fourth embodiment and the constitution of the digital watermark embedding device 180 in FIG. 25 and that of the digital watermark detection device 190 in FIG. 26 employed in the fifth embodiment, can be realized by recording programs for making a computer function as functional means which are the constituent element of the computer on a machine-readable recording medium, such as a ROM, a CD-ROM, a DVD-ROM, a floppy disk, a hard disk and a memory card, and causing the programs to be read by the computer, respectively. The programs may be downloaded through a communication line such as a network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital watermark embedding device, comprising:
an input section which inputs pixel value data of an image which is a target for embedding of watermark information;
an embedded position selection section which determines one or more positions in a frequency domain into which the watermark information is to be embedded, without depending upon a frequency component value associated with the frequency domain;
a frequency component value variation decision section which determines a variation of the frequency component value at each embedded position determined by the embedded position selection section;
a pixel value variation calculation section which calculates a variation of a pixel value at each point in a pixel value domain of the image based on the one or more embedded positions in the frequency domain determined by the embedded position selection section and based on the variation of the frequency component value determined by the frequency component value variation decision section;
a pixel value conversion section which embeds watermark information by changing corresponding pixel value data of the image in accordance with the variation of the pixel value at each point in the pixel value domain calculated by the pixel value variation calculation section; and
an output section which outputs pixel value data of the image into which watermark information has been embedded.

2. A digital watermark embedding device comprising:
an input section which inputs pixel value data of an image which is a target for embedding of watermark information;
an embedded position selection section which determines one or more positions in a frequency domain into which the watermark information is to be embedded, without depending upon a frequency component value associated with the frequency domain;
a frequency component value variation decision section which determines a variation of the frequency component value at each embedded position determined by the embedded position selection section;
a pseudo-random number generation section which generates a pseudo-random number by which a pixel value at each point in a pixel value domain of the image is multiplied for direct sequence spectrum spreading;
a pixel value variation calculation section which calculates a variation of the pixel value at each point in the pixel value domain of the image based on the one or more embedded positions in the frequency domain determined by the embedded position selection section, on the variation of the frequency component value determined by the frequency component value variation decision section and on the pseudo-random number corresponding to each point in the frequency domain of the image generated by the pseudo-random number generation section;
a pixel value conversion section which embeds watermark information by changing corresponding pixel value data of the image in accordance with the variation of the pixel value at each point in the pixel value domain calculated by the pixel value variation calculation section; and
an output section which outputs pixel value data of the image into which watermark information has been embedded.

3. A digital watermark embedding device comprising:
an input section which inputs pixel value data of an image which is a target for embedding of watermark information;
an embedded position selection section which determines one or more positions in a frequency domain into which the watermark information is to be embedded, without depending upon a frequency component value associated with the frequency domain;
a frequency component value calculation section which calculates the frequency component value at each embedded position determined by the embedded position selection section based on a pixel value at each point in a pixel value domain of the image;
a frequency component value variation decision section which determines a variation of the frequency component value at each embedded position determined by the embedded position selection section based on the frequency component value at the embedded position calculated by the frequency component value calculation section;
a pixel value variation calculation section which calculates a variation of the pixel value at each point in the pixel value domain of the image based on the one or more embedded positions in frequency domain determined by the embedded position selection section and on the variation of the frequency component value determined by the frequency component value variation decision section;
a pixel value conversion section which embeds watermark information by changing corresponding pixel value data of the image in accordance with the variation of the pixel value at each point in the pixel value domain calculated by the pixel value variation calculation section; and
an output section which outputs pixel value data of the image into which watermark information has been embedded.

4. A digital watermark embedding device comprising:
an input section which inputs pixel value data of an image which is a target for embedding of watermark information;
an embedded position selection section which determines one or more positions in a frequency domain into which the watermark information is to be embedded, without depending upon a frequency component value associated with the frequency domain;

a pseudo-random number generation section which generates a pseudo-random number by which a pixel value at each point in a pixel value domain of the image is multiplied for a spread spectrum;

a frequency component value calculation section which calculates the frequency component value at each embedded position determined by the embedded position selection section based on the embedded position, the pixel value at each point in the pixel value domain of the image and the pseudo-random number corresponding to each point in the pixel value domain of the image generated by the pseudo-random number generation section;

a frequency component value variation decision section which determines a variation of the frequency component value at each embedded position determined by the embedded position selection section based on the frequency component value calculated by the frequency component value calculation section, at each embedded position determined by the embedded position selection section;

a pixel value variation calculation section which calculates a variation of the pixel value of the image at each point in the pixel value domain based on the one or more embedded positions in the frequency domain determined by the embedded position selection section, on the variation of the frequency component value determined by the frequency component value variation decision section and the pseudo-random number generated by the pseudo-random number generation section and corresponding to each point in the frequency domain of the image;

a pixel value conversion section which embeds watermark information by changing corresponding pixel value data of the image in accordance with the variation of the pixel value at each point in the pixel value domain calculated by the pixel value variation calculation section; and an output section which outputs pixel value data of the image into which watermark information has been embedded.

5. The digital watermark embedding device according to claim 1, wherein the frequency component value variation decision section sets a variation to be set in advance based on a frequency distribution of frequency component values for a plurality of images.

6. The digital watermark embedding device according to claim 1, wherein while it is assumed that a variation of a pixel value at each point in pixel value domain of the image is $\Delta f(x)$, the embedded position in frequency domain determined by the embedded position selection section is u and the variation of a frequency component value determined by the frequency component value variation decision section is $\Delta F(u)$, the pixel value variation calculation section calculates an i-th matrix element $A^{-1}(x_i, u_i)$ of orthogonal transform and calculates a variation $\Delta f(x)$ of a pixel value from a calculation result in accordance with a formula:

$$\Delta f(x^{(1)}, \ldots, x^{(n)}) = A^{-1}(x^{(1)}, u^{(1)}) \cdot \ldots \cdot A^{-1}(x^{(n)}, u^{(n)}) \cdot \Delta F(u^{(1)}, \ldots, u^{(n)})$$

where n is an integer equal to or higher than 1.

7. The digital watermark embedding device according to claim 2 or claim 4, wherein while it is assumed that a variation of a pixel value at each point in pixel value domain of the image is $)f(x)$, the embedded position in frequency domain determined by the embedded position selection section is u, the variation of a frequency component value determined by the frequency component value variation decision section is $)F(u)$ and the pseudo-random number generated by the pseudo-random number generation means is $p(x)$, the pixel value variation calculation section calculates an i-th matrix element $A^{-1}(x_i, u_i)$ of orthogonal transform and calculates a variation $)f(x)$ of a pixel value from a calculation result in accordance with a formula:

$$)f(x^{(1)}, \ldots, x^{(n)}) = p(x^{(1)}, \ldots, x^{(n)}) \cdot A^{-1}(x^{(1)}, u^{(1)}) \cdot \ldots \cdot A^{-1}(x^{(n)}, u^{(n)}) \cdot )F(u^{(1)}, \ldots, u^{(n)})$$

where n is an integer equal to or higher than 1.

8. The digital watermark embedding device according to claim 1, further comprising:

a digital watermark detection section which calculates a frequency component value at the watermark information embedded position based on the image into which the watermark information has been embedded by the pixel value conversion section, and which feeds back the frequency component value or watermark information recovered from the frequency component value to the frequency component value variation decision section; and the frequency component value variation decision section adaptively changes the variation of a frequency component value based on the frequency component value or the watermark information fed back by the digital watermark detection section.

9. The digital watermark embedding device according to claim 1, further comprising:

a filtering section which inputs the image into which the watermark information is embedded by the pixel value conversion section and which conducts a data operation estimated in advance, to the image; and a digital watermark detection section which calculates a frequency component value at the watermark information embedded position based on the image subjected to the operation of the filtering section, and which feeds back the frequency component value or watermark information recovered from the frequency component value to the frequency component value variation decision section, wherein the frequency component value variation decision section adaptively changes the variation of a frequency component value based on the frequency component value or the watermark information fed back by the digital watermark detection section.

10. A digital watermark embedding and detection device, comprising:

a digital watermark embedding device; further comprising:

an input section which inputs pixel value data of an image which is a target for embedding of watermark information;

an embedded position selection section which determines one or more positions in a frequency domain into which the watermark information is to be embedded, without depending upon a frequency component value associated with the frequency domain;

a frequency component value variation decision section which determines a variation of the frequency component value at each embedded position determined by the embedded position selection section;

a pixel value variation calculation section which calculates a variation of a pixel value at each point in the pixel value domain of the image based on the one or more embedded positions in frequency domain determined by the embedded position selection section and based on the variation of the frequency component value determined by the frequency component value variation decision section;

a pixel value conversion section which embeds watermark information by changing corresponding pixel value data of the image in accordance with the variation of the pixel value at each point in the pixel value domain calculated by the pixel value variation calculation section; and an output section which outputs pixel value data of the image into which watermark information has been embedded; and a digital watermark detection device to detect the watermark information, further comprising:

a watermark information recovery section which recovers the watermark information based on the frequency component value at each embedded position calculated by the frequency component value calculation section.

11. A digital watermark embedding and detection device comprising:

a digital watermark embedding device, further comprising:

an input section which inputs pixel value data of an image which is a target for embedding of watermark information;

an embedded position selection section which determines one or more positions in a frequency domain into which the watermark information is to be embedded, without depending upon a frequency component value associated with the frequency domain;

a frequency component value variation decision section which determines a variation of the frequency component value at each embedded position determined by the embedded position selection section;

a pseudo-random number generation section which generates a pseudo-random number by which a pixel value at each point in a pixel value domain of the image is multiplied for direct sequence spectrum spreading;

a pixel value variation calculation section which calculates a variation of the pixel value at each point in the pixel value domain of the image based on the one or more embedded positions in the frequency domain determined by the embedded position selection section, on the variation of the frequency component value determined by the frequency component value variation decision section and on the pseudo-random number corresponding to each point in the frequency domain of the image generated by the pseudo-random number generation section;

a pixel value conversion section which embeds watermark information by changing corresponding pixel value data of the image in accordance with the variation of the pixel value at each point in the pixel value domain calculated by the pixel value variation calculation section;

an output section which outputs pixel value data of the image into which watermark information has been embedded; and a digital watermark detection device, further comprising:

a watermark information recovery section which recovers the watermark information based on the frequency component value at each embedded position calculated by the frequency component value calculation section.

12. A digital watermark embedding and detection device including a digital watermark embedding function of inputting pixel value data of an image which is a target for embedding of watermark information and outputting, after embedding the watermark information into the image, the pixel value data of the image into which the watermark information has been embedded and a digital watermark detection function of inputting pixel value data of an image which is a target for detection of watermark information and detecting the watermark information, comprising:

an embedded position selection section which determines one or more positions in a frequency domain into which the watermark information is to be embedded or the watermark information has been embedded, without depending upon a frequency component value associated with the frequency domain;

a pseudo-random number generation means which generates a pseudo-random number by which a pixel value at each point in a pixel value domain of the image is multiplied for a spread spectrum;

a frequency component value calculation section which calculates the frequency component value at each embedded position determined by the embedded position selection section, based on each embedded position, on the pixel value at each point in the pixel value domain of the image which is the target for embedding of the watermark information or the image which is the target for detection of the watermark information and on the pseudo-random number corresponding to each point in the pixel value domain of the image generated by the pseudo-random number generation section;

a frequency component value variation decision section which determines a variation of the frequency component value at each embedded position, based on the frequency component value calculation section at each embedded position determined by the embedded position selection section;

a pixel value variation calculation section which calculates a variation of the pixel value at each point in the pixel value domain of the image which is the target for embedding of the watermark information, based on the one or more embedded positions in the frequency domain determined by the embedded position selection section, on the variation of the frequency component value determined by the frequency component value variation decision section and on the pseudo-random number corresponding to each point in the pixel value domain of the image generated by the pseudo-random number generation section;

a pixel value conversion section which changes corresponding pixel value data of the image and thereby embeds watermark information in accordance with the variation of the pixel value at each point in pixel value domain calculated by the pixel value variation calculation section; and a watermark information recovery section which recovers the watermark information based on the frequency component value at each embedded position of the image which is the target for detection of the watermark information calculated by the frequency component value calculation means.

13. A machine-readable recording medium which records programs for allowing a computer to function as:
- an embedded position selection section which determines one or more positions in a frequency domain into which watermark information is to be embedded, without depending upon a frequency component value;
- a frequency component value variation decision section which determines a variation of the frequency component value at each embedded position determined by the embedded position selection section;
- a pixel value variation calculation section which calculates a variation of a pixel value at each point in a pixel value domain of an image which is a target for embedding of the watermark information, based on the one or more embedded positions in the frequency domain determined by the embedded position selection section and on the variation of the frequency component value determined by the frequency component value variation decision section; and
- a pixel value conversion section which embeds watermark information by changing corresponding pixel value data of the image in accordance with the variation of the pixel value at each point in pixel value domain calculated by the pixel value variation calculation section.

14. A machine-readable recording medium which records programs for allowing a computer to function as:
- an embedded position selection section which determines one or more positions in a frequency domain into which watermark information is to be embedded, without depending upon a frequency component value;
- a frequency component value variation decision section which determines a variation of the frequency component value at each embedded position determined by the embedded position selection section;
- a pseudo-random number generation section which generates a pseudo-random number by which a pixel value at each point in a pixel value domain of an image, which is a target for embedding of the watermark information, is multiplied for a spread spectrum;
- a pixel value variation calculation section which calculates a variation of the pixel value at each point in the pixel value domain of the image based on the one or more embedded positions in the frequency domain determined by the embedded position selection section, on the variation of the frequency component value determined by the frequency component value variation decision section and on the pseudo-random number corresponding to each point in the frequency domain of the image generated by the pseudo-random number generation section; and
- a pixel value conversion section which embeds watermark information by changing corresponding pixel value data of the image in accordance with the variation of the pixel value at each point in pixel value domain calculated by the pixel value variation calculation section.

15. A machine-readable recording medium which records programs for allowing a computer to function as:
- an embedded position selection section which determines one or more positions in a frequency domain into which watermark information is to be embedded, without depending upon a frequency component value;
- a frequency component value calculation section which calculates the frequency component value at each embedded position determined by the embedded position selection section based on a pixel value at each point in a pixel value domain of an image which is a target for embedding of the watermark information;
- a frequency component value variation decision section which determines a variation of the frequency component value at each embedded position determined by the embedded position selection section based on the frequency component value at the embedded position calculated by the frequency component value calculation section;
- a pixel value variation calculation section which calculates a variation of the pixel value at each point in the pixel value domain of the image based on the embedded position in the frequency domain determined by the embedded position selection section and on the variation of the frequency component value determined by the frequency component value variation decision section; and
- a pixel value conversion section which embeds watermark information by changing corresponding pixel value data of the image in accordance with the variation of the pixel value at each point in the pixel value domain calculated by the pixel value variation calculation section.

16. A machine-readable recording medium which records programs for allowing a computer to function as:
- an embedded position selection section which determines one or more positions in a frequency domain into which watermark information is to be embedded, without depending upon a frequency component value;
- a pseudo-random number generation section which generates a pseudo-random number by which a pixel value at each point in a pixel value domain of an image, which is a target for embedding of the watermark information, is multiplied for a spread spectrum;
- a frequency component value calculation section which calculates the frequency component value at each embedded position determined by the embedded position selection section based on the embedded position, the pixel value at each point in the pixel value domain of the image and the pseudo-random number corresponding to each point in the pixel value domain of the image generated by the pseudo-random number generation section;
- a frequency component value variation decision section which determines a variation of the frequency component value at each embedded position determined by the embedded position selection section based on the frequency component value calculated by the frequency component value calculation section, at each embedded position determined by the embedded position selection section;
- a pixel value variation calculation section which calculates a variation of the pixel value of the image at each point in the pixel value domain based on the one or more embedded positions in the frequency domain determined by the embedded position selection section, on the variation of the frequency component value determined by the frequency component value variation decision section and the pseudo-random number generated by the pseudo-random number generation section and corresponding to each point in the frequency domain of the image; and
- a pixel value conversion section which embeds watermark information by changing corresponding pixel value data of the image in accordance with the variation of the pixel value at each point in the pixel value domain calculated by the pixel value variation calculation section.

* * * * *

UNITED STATES PATENT AND TRADEMARK OFFICE
CERTIFICATE OF CORRECTION

PATENT NO. : 6,757,405 B1
DATED : June 29, 2004
INVENTOR(S) : Muratani et al.

It is certified that error appears in the above-identified patent and that said Letters Patent is hereby corrected as shown below:

Column 38,
Lines 16-17, change: $")f(x^{(I)}, \ldots, x^{(n)}) = p(x^{(I)}, \ldots, x^{(n)}) \cdot A^{-1}(x^{(1)}, u^{(1)}) \cdot \ldots \cdot A^{-1}(x^{(n)}, u^{(n)}) \cdot ) F(u^{(1)}, \ldots, u^{(n)})"$ to: $--)f(x^{(I)}, \ldots, x^{(n)}) = p(x^{(I)}, \ldots, x^{(n)}) \cdot A^{-1}(x^{(1)}, u^{(1)}) \cdot \ldots \cdot A^{-1}(x^{(n)}, u^{(n)}) \cdot ) F(u^{(1)}, \ldots, u^{(n)})--.$ Signed and Sealed this Ninth Day of November, 2004

JON W. DUDAS
*Director of the United States Patent and Trademark Office*